United States Patent [19]
Mahoney

[11] Patent Number: 5,239,596
[45] Date of Patent: Aug. 24, 1993

[54] LABELING PIXELS OF AN IMAGE BASED ON NEAR NEIGHBOR ATTRIBUTES

[75] Inventor: James V. Mahoney, Sunnyvale, Calif.

[73] Assignee: Xerox Corporation, Stamford, Conn.

[21] Appl. No.: 535,089

[22] Filed: Jun. 8, 1990

[51] Int. Cl.$^5$ .............................................. G06K 9/00
[52] U.S. Cl. ......................................... 382/34; 382/27
[58] Field of Search ........................ 382/16, 30, 34, 40, 382/27

[56] References Cited

U.S. PATENT DOCUMENTS

| | | | |
|---|---|---|---|
| 4,513,438 | 4/1985 | Graham et al. | 382/6 |
| 5,014,331 | 5/1991 | Kurogane et al. | 382/48 |
| 5,048,109 | 9/1991 | Bloomberg | 382/50 |
| 5,065,437 | 11/1991 | Bloomberg | 382/9 |
| 5,129,014 | 7/1992 | Bloomberg | 382/48 |
| 5,131,049 | 7/1992 | Bloomberg et al. | 382/9 |

FOREIGN PATENT DOCUMENTS

| | | |
|---|---|---|
| 0216158 | 4/1987 | European Pat. Off. . |
| 0380721 | 8/1990 | European Pat. Off. . |

OTHER PUBLICATIONS

European Search Report and Annex, EP 91 305173, dated Sep. 11, 1991.
Patent Abstracts of Japan, vol. 14, No. 303 (P14 1070)(4246) and (an abstract of JP-A-2 96 286) Jun. 29, 1990.
Patent Abstracts of Japan, vol. 14, No. 342 (C-743)(4285 and (an abstract of JP-A-2 124 131) Jul. 24, 1990.
Ullman, S., "Visual Routines," *Cognition*, vol. 18, 1984, pp. 97-159.
Mahoney, J. V., "Exhaustive directional Neighbor Linking and its Role in Image Analysis," *Canadian Psychology/Psychologie canadienne*, May 1989, vol. 30, No. 2a, p. 440. Abstract.
Mahoney, J. V., *Image Chunking: Defining Spatial Building Blocks for Scene Analysis*, Master of Science thesis, MIT Dept. of Electrical Eng. and Computer Sci., 1987, pp. 75-157 and 170-174.
Shafrir, A., "Fast Region Coloring and the Computation of Inside/Outside Relations," Master of Science thesis, Dept. of Mathematics, Feinberg Graduate School, Weizmann Institute of Science, Rehovot, Israel, May 1985, pp. 1-74.
Stout, Q. F., "Mapping Vision Algorithms to Parallel Architectures," *Proceedings of the IEEE*, vol. 76, No. 8, Aug. 1988, pp. 982-995.
Ballard, D. H., and Brown, C. M., *Computer Vision*, Prentice-Hall, Englewood Cliffs, N.J., 1982, pp. 106-113 and 149-165.
Pavlidis, T., *Algorithms for Graphics and Image Processing*, Computer Science Press, Rockville, Md., 1982, pp. 65-74 and 99-127.
Toussaint, G. T., "The Relative Neighborhood Graph of a Finite Planar Set," *Pattern Recognition* vol. 12, Aug. 1980, pp. 261-268.
Toussaint, G. T., "Pattern Recognition and Geometrical Complexity," *Proc. Fifth International Conf. on Pattern Recognition*, Miami Beach, Dec. 1980, pp. 1324-1347.

*Primary Examiner*—Leo H. Boudreau

[57] ABSTRACT

Pixels within an image are labeled based on near neighbor attributes. The attributes may be attributes for a near neighbor link or for a near neighbor pixel to which the link leads. The near neighbor attribute data for a pixel may indicate attributes for plural near neighbor links, and a link relationship criterion may be applied to determine whether the links are related in a manner that meets the criterion. For example, a pixel may be labeled only if its near neighbor links include a pair with relative orientation difference of approximately 180°, both of which have been previously labeled or are links to a boundary; this criterion is useful in labeling a partially bounded region. A distance independent connected component labeling criterion may be applied during parallel labeling of pixels for rapid connected component labeling. Labeling based on a near neighbor labeling criterion may be iterated until a component or region is completely labeled.

21 Claims, 12 Drawing Sheets

LABELING PIXELS OF AN IMAGE BASED ON NEAR NEIGHBOR ATTRIBUTES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to techniques for analyzing a body of data. More specifically, the invention relates to techniques that label pixels in an image.

Ullman, S., "Visual Routines," *Cognition*, Vol. 18, 1984, pp. 97-159, describes a coloring method at pages 103-105. Starting at a given point, the area around it is somehow activated. The activation spreads outward until a boundary is reached, but the activation is not allowed to cross the boundary. Depending on the starting point, either the inside or the outside of a curve, but not both, will be activated. Section 3.4, beginning on page 135, further discusses bounded activation or coloring, indicating that the results may be retained in the incremental representation for further use by additional routines. A sub-figure may be pulled out from its complicated background in this way, as shown and described in relation to FIG. 8. As shown and described in relation to FIG. 9, a boundary may not be entirely continuous, so that incomplete boundaries should have the capacity to block the activation spread. Section 3.4.2, beginning on page 137, describes the use of simple, local operations for coloring, with a first network in which each element excites its neighbors and a second network with a map of the discontinuity boundaries to check the activation spread.

SUMMARY OF THE INVENTION

One aspect of the invention is based on the recognition that conventional image analysis techniques make only limited use of near neighbor data. Techniques have not previously been developed that take advantage of the information about an image that is implicit in near neighbor data.

This aspect is further based on the discovery that a great deal of useful information about an image can be obtained by labeling pixels according to whether the relationship between a set of near neighbor links meets a link relationship criterion. The relationship could involve an attribute of the links to the near neighbors, it could involve an attribute received from the near neighbors, or both. For example, to label pixels within a region of an image, a pixel may be labeled based on whether two other pixels on opposite sides of it have previously been labeled or are points on the boundary of the region.

A closely related aspect of the invention is based on the recognition of a problem in analyzing curves and regions in an image. Many conventional image analysis techniques define sets of pixels by detecting connected curves that form closed boundaries. But typical images include open curves and regions that are only partially enclosed, features which are difficult to analyze with conventional techniques.

This aspect of the invention is further based on the discovery of near neighbor techniques that can define partially enclosed regions and other sets of pixels based on open curves and closed boundaries. A seed pixel in such a region can initially be labeled as being in the set of pixels. Each of the other pixels can then be labeled as being in the set if it has two near neighbors whose relative orientations differ by approximately 180°, with one of the near neighbors already in the set and the other either in the set or on a boundary. If a number of connected pixels or a large proportion of pixels within a bounded area are labeled as being in a set of pixels in this manner, the set of pixels defines a partially or completely bounded region.

Another aspect of the invention is based on the recognition of a general problem in labeling a large set of pixels such as the pixels of a large component or region. Conventional component labeling techniques such as spreading require many steps because the rate of spreading in each direction is usually one pixel per step.

This aspect is further based on the discovery that near neighbor data can be used to reduce the number of steps required for labeling a large set of pixels. A near neighbor criterion that is independent of distance to near neighbors can be applied in parallel to the pixels of an image. Under such a criterion, adjacency to a previously labeled pixel is not necessary. As a result, all pixels that meet the criterion can be labeled in parallel in one step, regardless of distance from previously labeled pixels.

Even though this technique can label a large number of pixels in a single step, more than one step may be necessary. A related aspect of the invention is based on the recognition that labeling based on a near neighbor criterion can be performed iteratively. Each step can include finding near neighbors that have already been labeled and then applying the near neighbor criterion to determine whether each owner of a labeled near neighbor should in turn be labeled. The technique can continue until a step fails to label any new pixels or fails to label more than a minimal number of new pixels.

The following description, the drawings, and the claims further set forth these and other objects, features and advantages of the invention.

DETAILED DESCRIPTION

A. Conceptual Framework

Figure 1:
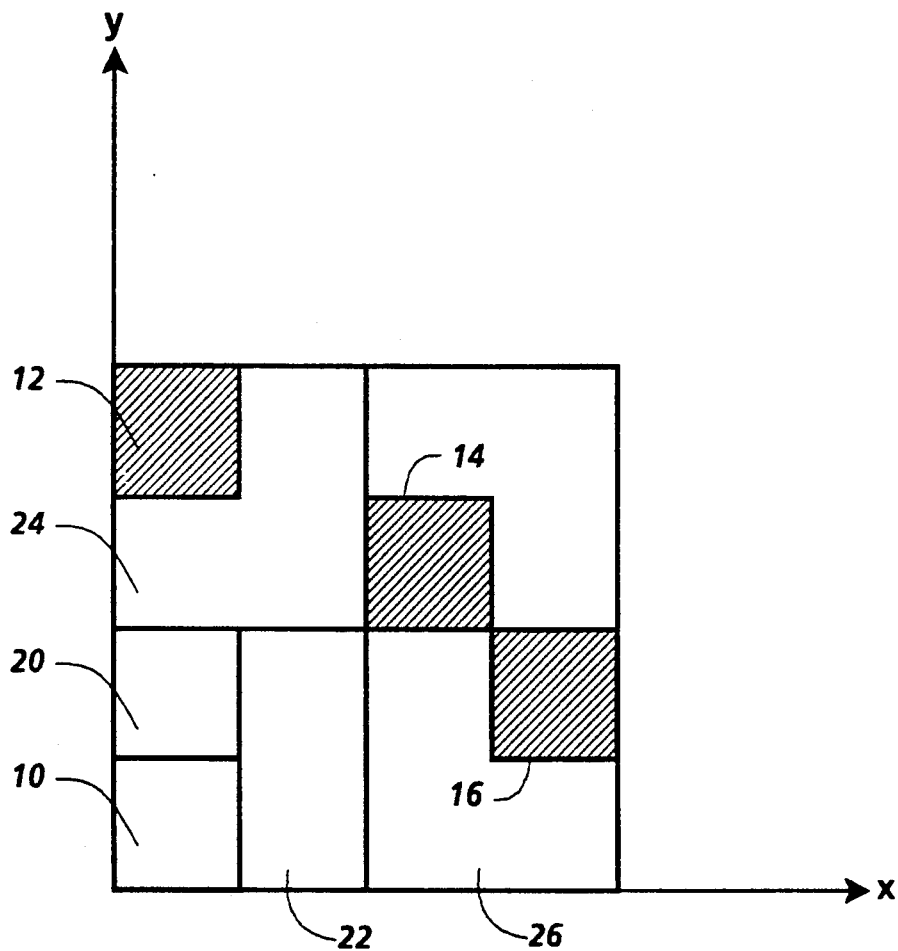
FIG. 1 is a schematic drawing showing an arrangement of pixels in an image with coordinate axes.

The following conceptual framework is helpful in understanding the broad scope of the invention, and the terms defined below have the meanings indicated throughout this application, including the claims. This conceptual framework is an extension of that set forth in the copending, coassigned U.S. patent application Ser. No. 07/535,796, entitled "Dense Aggregative Hierarchical Techniques for Data Analysis" ("the architecture application"), and Ser. No. 07/535,438 entitled "Exhaustive Hierarchical Near Neighbor Operations on an Image" ("the linking application"), which are both incorporated herein by reference in their entireties.

A "data processor" or "processor" is any component, combination of components, or system that can process data, and may include one or more central processing units or other processing components. A "processing unit" is a processor that is a component within another processor. Two processing units are "connected" by any combination of connections between them that permits communication of data from one of the processing units to the other.

"Memory" is any component, combination of components, or system that can store data, and may include local and remote memory and input/output devices.

A processor "accesses" data or a data structure by any operation that retrieves or modifies the data or data included in the data structure, such as by reading or writing data at a location in memory. A processor can be "connected for accessing" data or a data structure by any combination of connections with memory that permits the processor to access the data or the data structure.

A "data structure" is any combination of interrelated items of data. An item of data is "included" in a data structure when it can be accessed using the locations or data of other items in the data structure; the included item of data may be another data structure. An "array of data" or "data array" or "array" is a data structure that includes items of data that can be mapped into an array. A "two-dimensional array" is a data array whose items of data can be mapped into an array having two dimensions.

A processor "operates on" data or a data structure by performing an operation that includes obtaining a logical or numerical result that depends on the data or data structure.

To "obtain" or "produce" data or a data structure is to perform any combination of operations that begins without the data or the data structure and that results in the data or data structure. Data or a data structure can be "obtained from" or "produced from" other data or another data structure by any combination of operations that obtains or produces the data or data structure by operating on the other data or on data in the other data structure. For example, an array can be obtained from another array by operations such as producing a smaller array that is the same as a part of the other array, producing a larger array that includes a part that is the same as the other array, copying the other array, or modifying data in the other array or in a copy of it.

A "hierarchy" of data items includes data items, each of which is at one of a series of levels within the hierarchy. To "produce" a hierarchy of data items is to perform a combination of operations that begins without the complete hierarchy of data items and that includes the production of all of the data items of the hierarchy that are not present at the beginning. In other words, a hierarchy may be produced by a combination of operations that ends when all of the data items of the hierarchy have been produced, whether or not all of the data items are still stored. All of the data items of all of the levels could still be stored at the end of the operations, but the hierarchy is produced even though some of the data items are not stored after being used to produce data items at a higher level.

To produce a hierarchy "sequentially" is to produce the hierarchy by a sequence of substeps in which the first substep produces a first higher level of data items from a lowest level of data items, the second substep produces a second higher level of data items from the first higher level, and so forth.

Data "indicates" an attribute when the data indicates the presence of the attribute or a measure of the attribute. An "aggregative data item" is an item of data that indicates an attribute of a group of other data items. In a hierarchy of data items, a given level can include aggregative data items, each of which indicates an attribute of a respective group of data items of the next lower level of the hierarchy.

An "aggregative operation" is an operation on a set of data items, called input data items below, that produces a set of aggregative data items, called resulting data items below, with each of the aggregative data items being produced by operating on a respective set of the input data items. The respective sets of input data items are "evenly distributed" in relation to the complete set of input data items if each of the input data items is included in roughly the same number of respective sets of input data items as every other input data item and if no two of the respective sets are identical.

If the respective sets of input data items on which an aggregative operation is performed are all of the same size $\alpha$, the "aggregation degree" of the aggregative operation is equal to $\alpha$. More generally, the respective sets of input data items could each have one of a small number of different sizes $\alpha_1, \alpha_2, \ldots$ For the aggregative operations discussed below, $\alpha$ is generally greater than 1 and small compared to the number of input data items, except as otherwise indicated.

The "density" of an aggregative operation is the ratio c of the number of resulting data items to the number of input data items. This ratio can be related to the aggregation degree $\alpha$ as follows, assuming in each case that the respective sets are evenly distributed: A "minimal aggregative operation" is one for which c is approximately equal to $1/\alpha$, so that each of the input data items is in one of the respective sets of input data items. A "dense aggregative operation" is one for which c is not substantially less than 1, so that each of the input data items is in not substantially less than $\alpha$ respective sets of input data items. An "exhaustive aggregative operation" is a dense aggregative operation for which c is equal to 1, so that each of the input data items is in $\alpha$ respective sets of input data items.

A "hierarchical aggregative operation" is a combination of operations that sequentially produce a hierarchy and in which each substep of the sequence is an aggregative operation. An "aggregative hierarchy" is a hierarchy produced by a hierarchical aggregative operation. An aggregative hierarchy can be described as "minimal," "exhaustive," or "dense" if all of the substeps of the hierarchical aggregative operation that produces it are minimal, exhaustive, or dense, respectively. A "mixed aggregative hierarchy" is produced by a hierarchical aggregative operation that includes aggregative operations of varying densities, possibly including minimal, exhaustive, and other densities that are between minimal and exhaustive or greater than exhaustive.

An "image" is a pattern of light. Data "defines" an image or another signal when the data includes sufficient information to produce the image or signal. For example, an array can define all or any part of an image, with each item of data in the array providing a value indicating the color of a respective location of the image.

A "dimensioned body of data" is a body of data that maps into a space that includes one or more dimensions. For example, an array that defines a two-dimensional image is a dimensioned body of data. A "geometric structure" is a configuration of data items that occurs in a dimensioned body of data. Examples of geometric structures include points; relations among points; properties of points, such as color, surface orientation, or depth; configurations of points, such as lines and curves, line junctions, corners, angles, connected regions, region boundaries, surfaces, solids; and so forth.

Each location in an image may be called a "pixel." In a body of data defining an image in which each item of data provides a value, each value indicating the color of a location may be called a "pixel value." Each pixel value is a bit in the "binary form" of the image, a grey-scale value in a "grey-scale form" of the image, or a set of color space coordinates in a "color coordinate form" of the image, the binary form, grey-scale form, and color coordinate form each being a body of data defining the image.

The "relative orientation" between two pixels in an image is a measure of the direction within the image from one of the pixels to the other.

The "distance" between two pixels in an image is a measure of the number of pixels between them, assuming generally uniform pixel size and shape. In a two-dimensional image, for example, the distance between two pixels can be measured by x- and y-offsets, and distances can be compared by taking the sums of squares of the offsets. Two pixels are "near" when the distance between them is relatively small, considered in some context.

A "near neighbor pixel" or a "near neighbor" for a given pixel in an image is a pixel in the same image that meets a criterion, referred to herein as a "near neighbor criterion," and which is near to the given pixel when considered in relation to other pixels that meet the criterion. For example, the criterion could be that the near neighbor pixel must be a black pixel, in which case the near neighbors of the given pixel would be nearby black pixels. The determination of which pixels are near may be made in any appropriate way, unless otherwise specified. A near neighbor criterion is "distance independent" if it does not depend on the distance to the near neighbor pixel.

"Near neighbor attribute data" is data indicating an attribute relating to a near neighbor pixel. For example, near neighbor attribute data could be "near neighbor distance data" indicating a distance, "near neighbor orientation data" indicating an orientation, or any data indicating an attribute for the near neighbor pixel. Near neighbor attribute data need not uniquely identify a near neighbor pixel, and may relate to a set of more than one near neighbor pixels.

A "link" is the relationship between a pixel, called an "owner," and a near neighbor pixel, called a "neighbor."

A "boundary pixel" is a pixel in a boundary of a figure that occurs in an image.

Given two orientations, $\theta_1$ and $\theta_2$, defined in the range 0° to 360°, the "orientation difference" $\Delta_\theta(\theta_1, \theta_2)$ is defined as $[\min(\theta_h - \theta_l, (\theta_l + 360) - \theta_h)]$, where $\theta_h = \max(\theta_1, \theta_2)$ and $\theta_l = \min(\theta_1, \theta_2)$, and the "acute orientation difference" $\delta_\theta(\theta_1, \theta_2)$ is defined as $[\min(\theta_h - \theta_l, (\theta_l + 180) - \theta_h)]$, where $\theta_h = \max(\mod(\theta_1, 180), \mod(\theta_2, 180))$, $\theta_l = \min(\mod(\theta_1, 180), \mod(\theta_2, 180))$.

B. General Features

Figure 2:
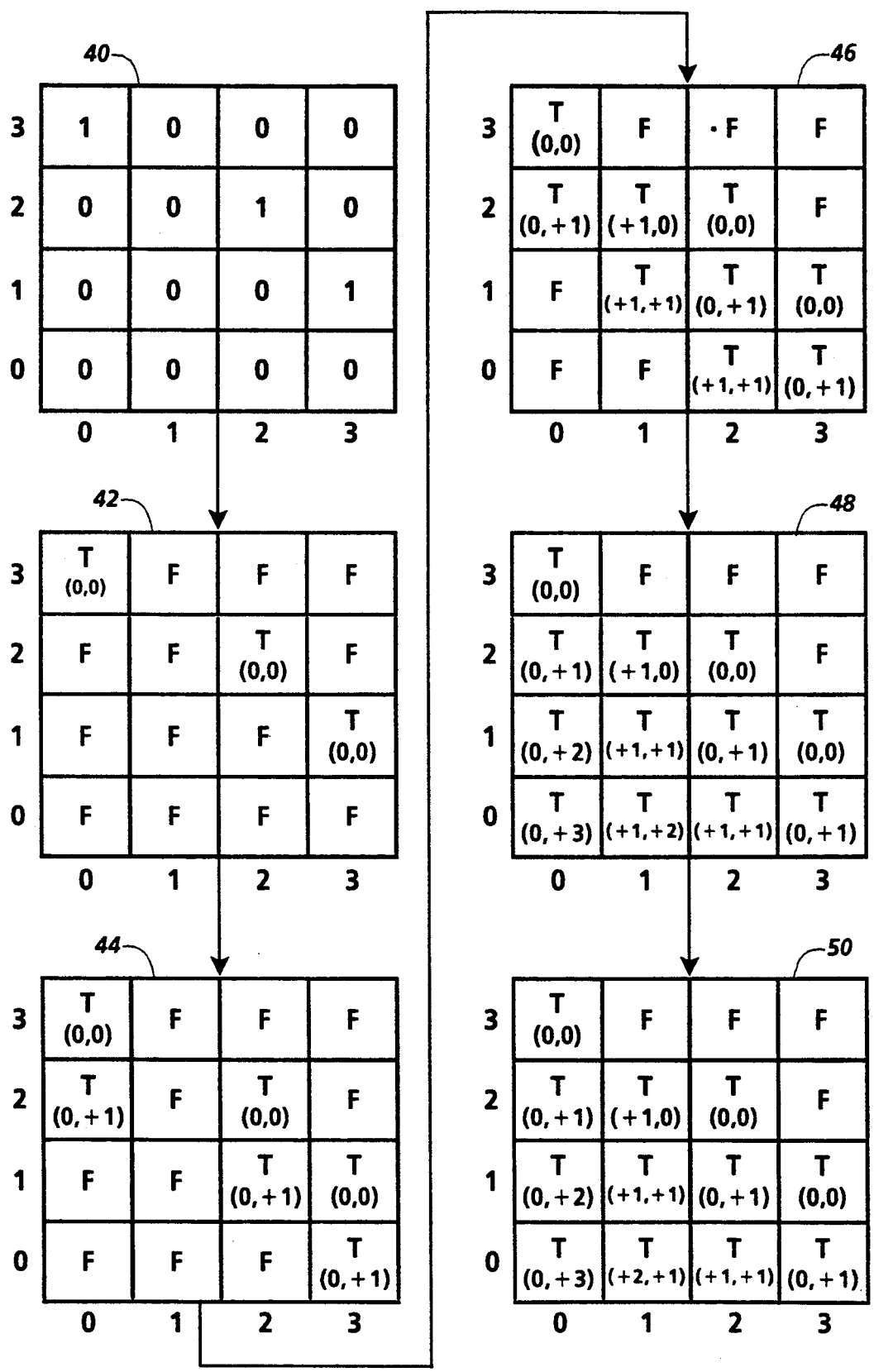
FIG. 2 is a flow diagram showing a sequence of arrays of data forming an exhaustive hierarchy of near neighbor data items.
Figure 3:
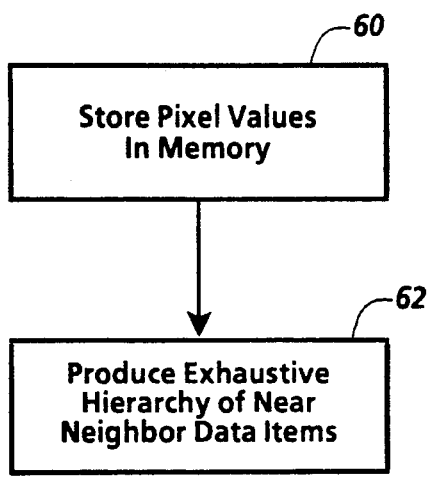
FIG. 3 is a flow chart showing general steps in producing an exhaustive hierarchy of near neighbor data items.
Figure 4:
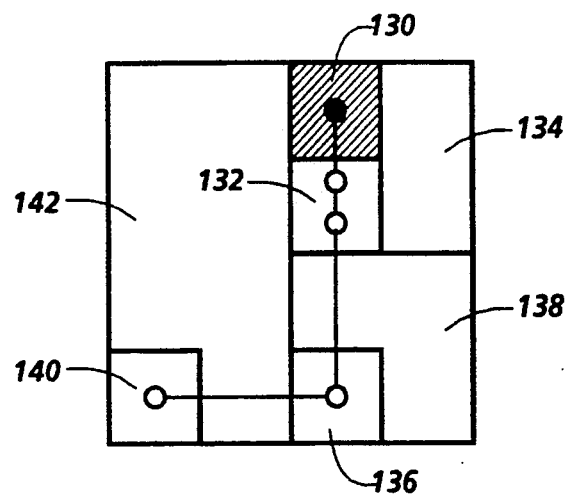
FIG. 4 is a schematic diagram of an arrangement of pixels showing a path from a neighbor pixel to an owner pixel.
Figure 5:
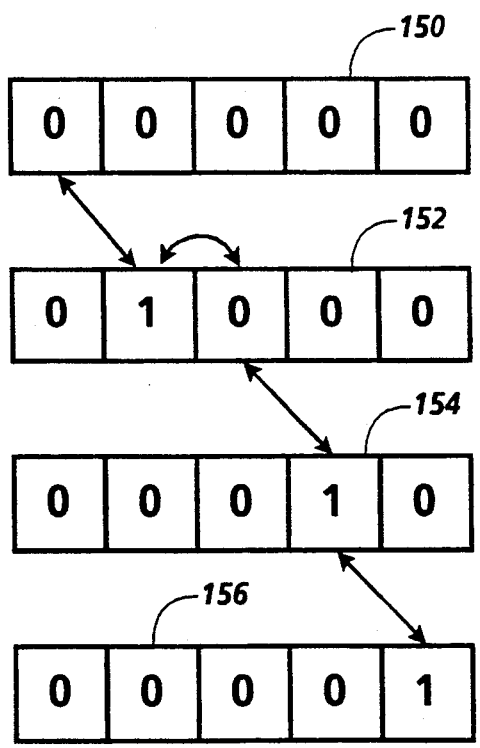
FIG. 5 is a schematic diagram of bit vectors storing data defining a path from a neighbor pixel to an owner pixel.
Figure 6:
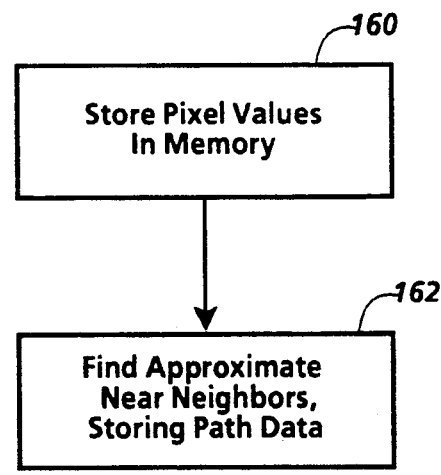
FIG. 6 is a flow chart showing general steps in storing path data according to the invention.
Figure 7:
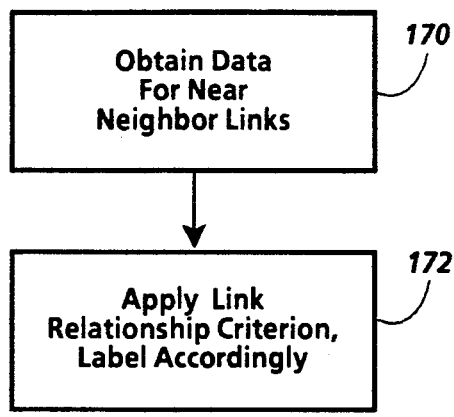
FIG. 7 is a flow chart showing general steps in labeling pixels using a link relationship criterion according to the invention.
Figure 8:
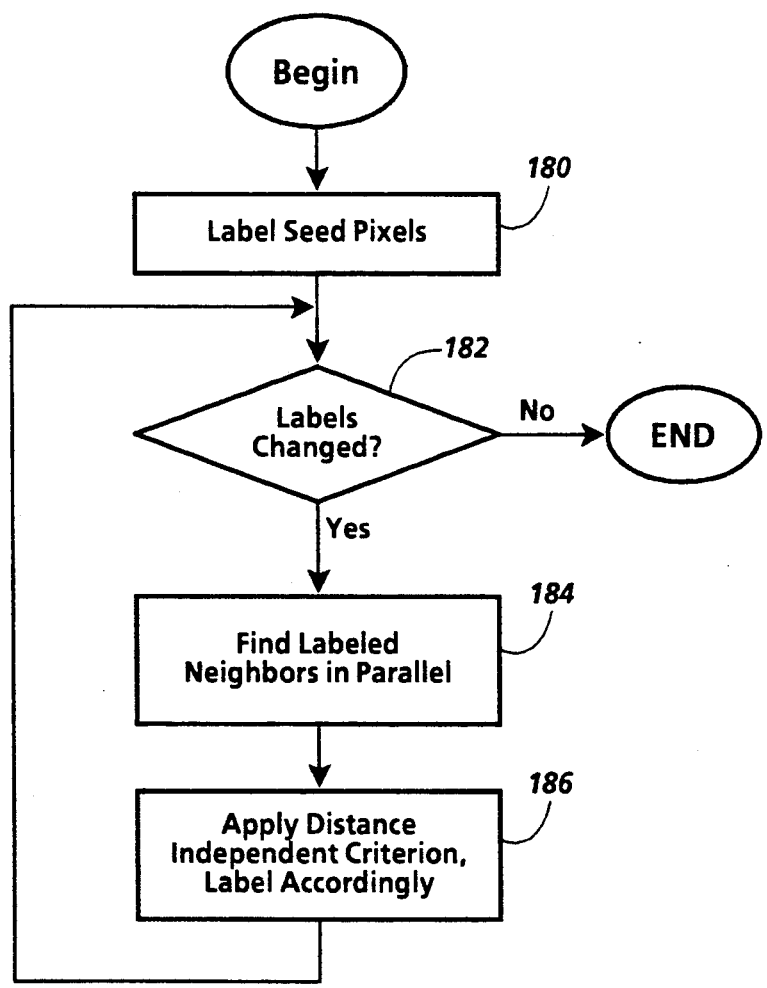
FIG. 8 is a flow chart showing general steps in labeling pixels interatively and in parallel according to the invention.

FIGS. 1–8 illustrate general features of the invention. FIG. 1 shows graphically how an approximate near neighbor may be found. FIG. 2 shows a sequence of arrays of near neighbor data items produced to find approximate near neighbors. FIG. 3 shows general steps in finding approximate near neighbors. FIG. 4 shows a path from a pixel to another pixel of which it is an approximate near neighbor. FIG. 5 shows a set of bit vectors defining a path between the pixels in FIG. 4. FIG. 6 shows general steps in storing path data. FIG. 7 shows general steps in labeling pixels according to a link relationship criterion. FIG. 8 shows general steps in iterative labeling by applying a near neighbor criterion that is independent of distance in parallel.

FIG. 1 shows pixel 10, a white pixel that occurs in an image that also includes black pixels 12, 14, and 16, all of which are relatively near pixel 10. FIG. 1 also illustrates how one of pixels 12, 14, and 16 can be found to be an approximate near neighbor of pixel 10.

The lower left corner of pixel 10 is shown as the origin of x- and y-coordinates within the image. Pixel 10 can first be combined with pixel 20 to form a rectangular region. This rectangular region can then be combined with rectangular region 22, similarly formed by combining pixels, then with square region 24, then with rectangular region 26, and so forth, until pixels 12, 14, and 16 are found. As pixels are combined to form regions in this manner, data is produced indicating whether each region includes a pixel that meets a near neighbor criterion, such as being a black pixel.

When square region 24 is formed, its near neighbor data can indicate that it includes a near neighbor pixel, pixel 12. Its near neighbor data can also indicate the distance from the lower left corner of square region 24 such as by providing a pair of x- and y-offsets (0, +1). Then, when the square region that includes pixel 10 is combined with square region 24, the near neighbor data for the resulting rectangular region can indicate that it also includes a near neighbor pixel, and can indicate the distance with the pair of offsets (0, +3), produced by adding the offsets of square region 24 to the offsets from the lower left corner of pixel 10 to the lower left corner of square region 24, which are (0, +2).

Similarly, when rectangular region 26 is formed, its near neighbor data can indicate the presence of pixel 16 at offsets (+1, +1) from the lower left corner of region 26. Pixel 16 can be found to be the near neighbor by comparing its offsets (+1, +1) from the lower left hand corner of region 26 to the offsets (0, +2) of pixel 14, obtained like the offsets for pixel 12 as described above. Then, when rectangular region 26 is combined with the similar rectangular region that includes pixel 10, the near neighbor data for the resulting square region can indicate the presence of a pixel and the offsets (0, +3) to pixel 12, because it is nearer than pixel 16, which is at offsets (+3, +1).

Pixel 12 is called an approximate near neighbor because it may not be the near neighbor of pixel 10 according to some criteria. By some criteria, pixel 14 may be the near neighbor of pixel 10.

FIG. 2 shows a sequence of data arrays that can be produced to find pixel 12 as an approximate near neighbor of pixel 10 in FIG. 1. Each array includes a respective data item for each pixel, with the respective data items of pixels 10, 12, 14, and 16 at positions (0, 0), (0, 3), (2, 2), and (3, 1), respectively. The sequence begins with array 40, in which each pixel's respective data item includes a pixel value, "0" for a white pixel and "1" for a black pixel.

Each data item in array 42 is a starting near neighbor data item that indicates whether a region of single pixel size includes a near neighbor pixel and, if so, the offsets from the respective pixel to the near neighbor. Each data item in array 42 that indicates presence of a near neighbor pixel also includes x- and y-offsets of (0, 0).

Each data item in array 44 is produced by combining the respective data item in array 42 with the first data item above it. Each data item in array 44 therefore indicates the presence of a near neighbor pixel in a rectangular two pixel regions.

Each data item in array 46 is produced by combining the respective data item in array 44 with the first data item to its right. The pixel at (2, 1) in array 46 is produced by arbitrarily selecting between two equidistant near neighbor pixels, pixels 14 and 16.

Each data item in array 48 is produced by combining the respective data item in array 46 with the second data item above it. The data item at (2, 0) in array 48 is produced by selecting the nearer of two near neighbor pixels, pixels 14 and 16, based on the offsets in the data items at (2, 0) and (2, 2) in array 46. The offsets of pixel 14, (0, +2), are produced by adding the offsets on the data item at (2, 2) and the offsets from position (2, 0) to position (2, 2), which are (0, +2). The offsets of pixel 16, (+1, +1) are taken directly from the data item at position (2, 0) in array 46. The offsets can be compared by comparing the sum of their squares, with pixel 16 being a nearer neighbor according to this criteria.

Each data item in array 50 is produced by combining each data item in array 48 with the second data item to its right. The data item at position (0, 0) in array 50 is produced by selecting the nearer of two neighbor pixels, pixels 12 and 16, based on offsets of (0, +3) and (+3, +1) from array 48, produced as described above. Since pixel 12 is nearer according to the sum of squares criterion, it is selected as the near neighbor.

The arrays in FIG. 2 can be produced very quickly in parallel, with each processing unit producing all the data items for a respective pixel. The processing units can be interconnected so that each processing unit receives the results from other processing units as necessary.

FIG. 3 shows general steps in producing the sequence of FIG. 2. The step in box 60 stores pixel values for the pixels of an image in memory. The step in box 62 then produces a hierarchy of near neighbor data items by operating on the stored pixel values. Each pixel's near neighbor data item at each level indicates a near neighbor attribute for the pixel.

FIG. 4 shows a path from black pixel 130 in an image to another pixel of which pixel 130 is an approximate near neighbor. As shown, pixel 132 is the second pixel on the path, because pixels 130 and 132 are combined to form a rectangular region within which pixel 130 is the near neighbor pixel. The path stays in pixel 132 for another level because pixel 130 is also the near neighbor pixel when the rectangular region is combined with rectangular region 134 to form a square region. Then, the path goes to pixel 136, when the square region is combined with square region 138 to form a rectangular region. Finally, the path goes to pixel 140 when the rectangular region is combined with rectangular region 142 to form a square region.

In producing the hierarchy of data items to find approximate near neighbors, data about near neighbors is communicated along the path between pixel 130 and pixel 140, which can be called an "owner" that has pixel 130 as a near neighbor. The path between pixel 130 and pixel 140 can also be used for communication of data at other times, either from owner to neighbor or from neighbor to owner. Rather than repeating the operations to find near neighbors each time this path is used, data defining the path can be stored for subsequent use in following the path.

FIG. 5 shows four bit vectors that, together, define the path between pixel 130 and pixel 140. Bit vector 150, which could be stored in the local memory of a processing unit obtaining the near neighbor data items for pixel 130, includes all zeros, indicating that none of its approximate near neighbors are received from another processing unit, which is appropriate for a black pixel. Bit vector 152, for pixel 132, includes a "1" at the second level, indicating that it receives its approximate near neighbor at the second level from another processing unit, in this case the processing unit for pixel 130. Bit vector 154, for pixel 136, includes a "1" at the fourth level, because it receives its approximate near neighbor at the fourth level from the processing unit for pixel 132. Bit vector 156, for pixel 140, includes a "1" at the fifth level, because it receives its approximate near neighbor at the fifth level from the processing unit for pixel 136.

When bit vectors as shown in FIG. 5 have been stored at the processing units, data can be communicated in either direction on the path between pixel 130 and pixel 140 based on the bit vectors, as shown by arrows in FIG. 5. Since each near neighbor may have several owners, following the path from neighbor to owner may lead to several owners. On the other hand, following the path from owner to neighbor may lead to collisions, because two owners may provide different data to the same neighbor.

FIG. 6 shows general steps in producing path data such as the bit vectors in FIG. 5. The step in box 160 stores the pixel values of an image in memory, and the step in box 162 finds approximate near neighbors, storing path data indicating a path between a pixel and its near neighbor pixel. The path data can indicate a path by indicating, for a first processing unit producing a near neighbor data item at a given level in a hierarchy, a second processing unit that produced the near neighbor data item at the next lower level that is used by the first processing unit to produce its near neighbor data item.

FIG. 7 shows general steps in labeling pixels according to a link relationship criterion. The step in box 170 obtains data for a number of near neighbor links. For example, the data may indicate links to a number of near neighbors of a single pixel or links to near neighbors of a number of pixels. Then, the step in box 172 applies a link relationship criterion to determine whether the relationship between the near neighbor links meets the criterion. If, for a given pixel, the relationship meets the criterion, the pixel is labeled accordingly.

FIG. 8 shows general steps in iteratively applying labels based on a distance independent near neighbor criterion. The step in box 180 begins by labeling seed pixels within the set of pixels being labeled. Then, the step in box 182 begins an iterative loop by testing whether the previous iteration produced a sufficient change in the set of labeled pixels to justify another iteration. For example, the test could determine whether there was any change or, alternatively, whether the number of changed pixels was greater than a minimum number.

If there was a change in the previous iteration, the step in box 184 finds, for each pixel, a set of near neighbors, applying a criterion that is met by pixels that have previously been labeled. This step is performed in parallel. Then, the step in box 186 applies a labeling criterion to the near neighbors that is independent of distance, labeling each pixel whose set of near neighbors meets the criterion.

C. An Implementation

Some features of the invention have been implemented on a Connection Machine from Thinking Machines Corporation, using the in-place implementation techniques described in the architecture application and exhaustive hierarchical near neighbor data produced as described in the linking application. The implementation includes underlying image linking operations and higher level applications that operate on data produced by the linking operations.

1. Image Linking

Figure 9:
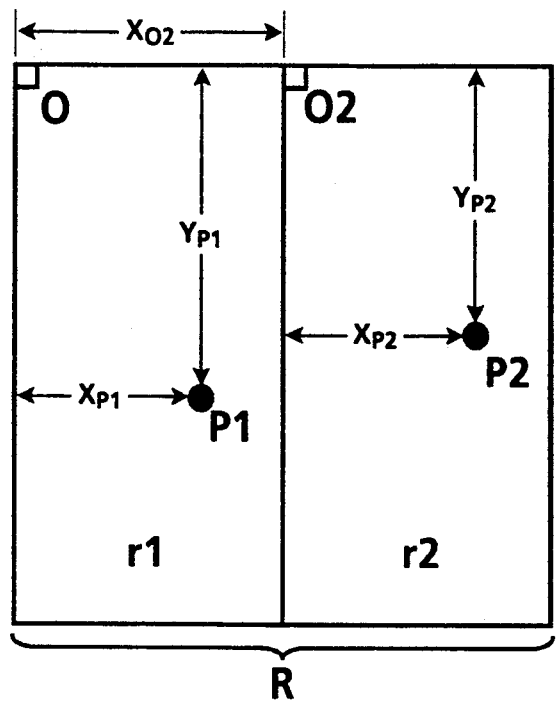
FIG. 9 is a schematic diagram of an arrangement of pixels showing how rectangular regions are combined into a square region in finding near neighbors.
Figure 10:
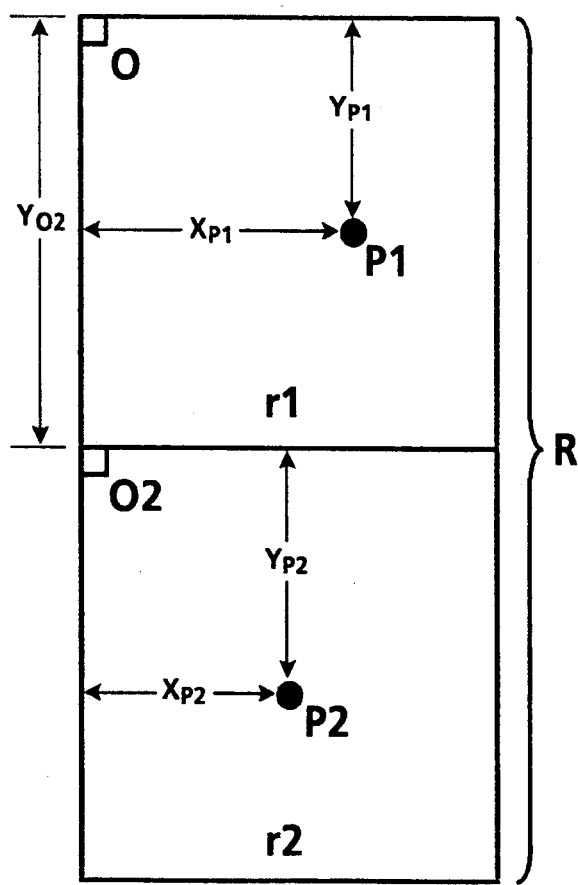
FIG. 10 is a schematic diagram of an arrangement of pixels showing how square regions are combined into a rectangular region in finding near neighbors.

The Connection Machine implementation uses a local hierarchical process to find, in parallel for every pixel in an image, the near neighboring black pixels in each quadrant. FIGS. 9 and 10 show designations of regions, pixels, and offsets in the fourth quadrant, but the same designations can be used in any of the four quadrants. The pixel for which a near neighbor is being sought is O, at the upper left corner of subregion r1 of region R. Subregion r2 of region R, shaped the same as r1, has pixel O2 in its upper left corner, offset by $x_{O2}$, $y_{O2}$ from O. Subregion r1 may contain one or more black pixels; if it does, the black pixel nearest to O, pixel p1, is at offsets $x_{p1}$, $y_{p1}$ from O. Subregion r2 may similarly contain one or more black pixels; if it does, the black pixel nearest to O2, pixel p2, is at offsets $x_{p1}$, $y_{p1}$ from O2 and at offsets $x_{O2}+x_{p2}$, $y_{O2}+y_{p2}$ from O.

The signs of $x_{O2}$ and $y_{O2}$ determine quadrant. For the first quadrant, the origin is the lower-left corner of the region. For the second quadrant, the origin is the lower-right corner of the region. For the third quadrant, the origin is the upper-right corner of the region.

Figure 11:
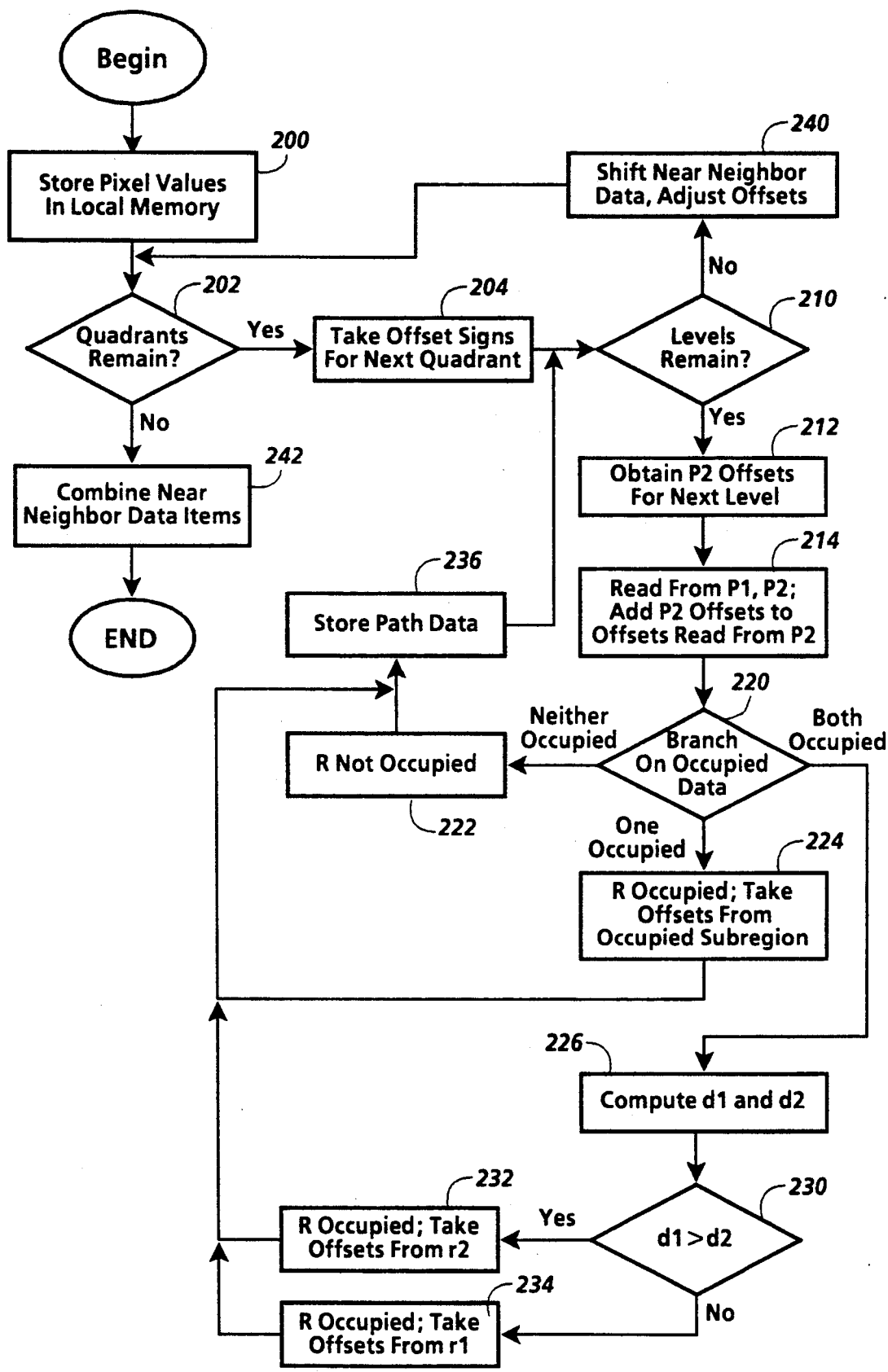
FIG. 11 is a flow chart showing steps in finding near neighbors for each quadrant.

FIG. 11 shows steps followed in finding approximate near neighbor pixels in all four quadrants for a square image of width N. These steps produce an exhaustive hierarchy of near neighbor data items for each quadrant, using an in-place implementation in which each processing unit produces all the near neighbor data items for a respective pixel. The hierarchy includes $h+1$ levels, where $h=2 \log N$. The regions on level $l=0$ are one pixel in size, while the regions on level $l=h$ are as large as the entire image.

The processor P producing the near neighbor data item for a region R operates on the results produced by processors P1 and P2 for subregions r1 and r2, respectively. Uniform communication between processors is implemented by shifting the array. The offsets of P1 from P are (0,0), so that P1 is P and communication between P1 and P is done by transferring values between different memory locations in the same processor. The absolute values of the offsets of P2 from P, ($x_{O2}$, $y_{O2}$), are $(2^{(l-1)/2}, 0)$ at odd levels and $(0, 2^{(l/2)-1})$ at even levels,. The signs of these offsets depend on the quadrant of interest: the x offset is positive in the first and fourth quadrants and negative otherwise; the y offset is positive in the first and second quadrants and negative otherwise.

FIG. 11 shows steps performed in producing near neighbor data for each quadrant. The step in box 200 stores pixel values in the local memories of the processing units such that each processing unit can access the respective pixel's pixel value. The test in box 202 begins an iterative loop that produces the near neighbor data for each quadrant. The step in box 204 takes the signs for the offsets to be used in the next quadrant. The test in box 210 begins an iterative loop that produces the near neighbor data items for each level in the hierarchy. The step in box 212 obtains the offsets from P to P2 for the next level.

The steps in box 214 and the following boxes are performed in parallel by the processing units. In box 214, each processing unit P reads the near neighbor data from P1, which is the same as P, and P2. Each processing unit adds the offsets to P2 from box 212 to the offsets in the near neighbor data from P2, to obtain offsets from P. Each processing unit then branches based on whether r1 and r2 are occupied, as indicated by the respective near neighbor data items. If neither is occupied, the step in box 222 produces a near neighbor data item that indicates that R is not occupied. If one is occupied, the step in box 224 produces a near neighbor data item that indicates that R is occupied and that includes the offsets from P to the near neighbor pixel in the occupied subregion. If both are occupied, the step in box 226 computes the distances d1 to p1 in r1 and d2 to p2 in r2, by operating on the offsets from box 214. These distances can be calculated using the following equations: $d1^2 = x_{p1}^2 + y_{p1}^2$ and $d2^2 = (x_{O2}+x_{p2})^2 + (y_{O2}+y_{p2})^2$. The step in box 230 then branches based on whether d1 is greater than d2. If so, the step in box 232 produces a near neighbor data item indicating that R is occupied and including the offsets from P to p2 in r2. If not, the step in box 234 produces a near neighbor data item indicating that R is occupied and including the offsets from P to p1 in r1.

When the near neighbor data item has been produced, the step in box 236 stores path data. This data can be stored in a data structure that, for a given quadrant, explicitly stores the hierarchical paths from neighbor locations to their owners. If the paths between neighbors and owners are heavily used, the stored hierarchical paths mean that the offsets need be computed only once. There is one path from a neighbor to each of its owners. The complete set of paths from neighbors to owners, for one quadrant, may be represented by a single bit in each processing unit at each level of the hierarchy—a bit vector of length h in each processing unit, altogether. If a processing unit P is on some path, then the bit at a given level in the hierarchy defines which of that processing unit's children P1 and P2 is also on the path. In other words, it defines which subregion contains the nearest neighbor. Storage in this data structure—termed the link bit vector—is heavily shared across different links.

The step in box 236 can generate the link bit vector for each processing unit for each quadrant. Each processing unit's local memory holds an additional variable L, a bit vector to store the links, indexable by level in the hierarchy. A "0" in a given bit of L indicates that the neighbor, if any, is included in r1. A "1" in a given bit of L indicates that the neighbor, if any, is included in r2. In addition, as discussed below, it may be convenient to insert "0" in a given bit of L if there is no neighbor at the respective level. The step in box 236 stores the appropriate value into bit l of L.

When all of the levels of the hierarchy have been produced, each processing unit's near neighbor data item includes offsets to the nearest black pixel in the specified quadrant, inclusive of the black pixel at the location of that processing unit, if any. In other words, the x and y offsets are both zero at a black pixel. A useful way of viewing this problem is that the algorithm gives inclusive results because it employs a discrete definition of the quadrants in which the quadrants include the origin location O. Exclusive results can be obtained without special-case computations for gaps between quadrants by defining the quadrants asymmetrically so as not to include the origin location.

To obtain an exclusive result at each location, the step in box 240 shifts near neighbor data items and adjusts offsets. The offsets of the adjacent pixels from which a pixel receives shifted neighbor offsets are $(+1,0)$ for the first quadrant, $(0,-1)$ for the second quadrant, $(-1,0)$ for the third quadrant, and $(0,+1)$ for the fourth quadrant. The step in box 240 can thus be implemented as follows: For each pixel p, let the adjacent pixel in the specified quadrant be q. If q is a white pixel, then the offsets of q from p are added to the neighbor offsets stored at q to get the neighbor offsets for p. If q is a black pixel, then the offsets of q from p are the new neighbor offsets for p—that is, q is itself p's nearest neighbor in the quadrant in question. Note that p may be black or white. This step modifies neighbor offsets at all pixels, making them consistent with a discrete definition of the quadrants.

When near neighbor data for all quadrants have been produced, the optional step in box 242 combines the near neighbor data items. For example, it may be desirable to reduce the memory required to store the near neighbor data items, such as by saving only the nearest of the near neighbors or by encoding the near neighbor data items in a more compact form.

2. Data Communication

While finding near neighbors in a given quadrant, the steps in FIG. 11 can also be used to communicate data from the neighbor locations (such as the values of local geometric properties stored in other arrays) to the locations of which they are neighbors, called the owners. For example, the local value of a geometric property could be communicated from each neighbor to its owners. To implement this, each processing unit's local memory can contain an additional variable v for holding data being transmitted. At the beginning of the iterative loop for each quadrant, as part of the step in box 204, v can be initialized to the appropriate value at each pixel, to be transmitted to the owners of that pixel. After each level of the hierarchy is produced, if the neighbor of O in R is found to be in r1, the contents of v in P1 are read and stored into v in P as part of the step in box 224 or as part of the step in box 234; if the neighbor of O is found to be in r2, the contents of v in P2 are read and stored into v in P as part of the step in box 224 or as part of the step in box 232.

Figure 12:
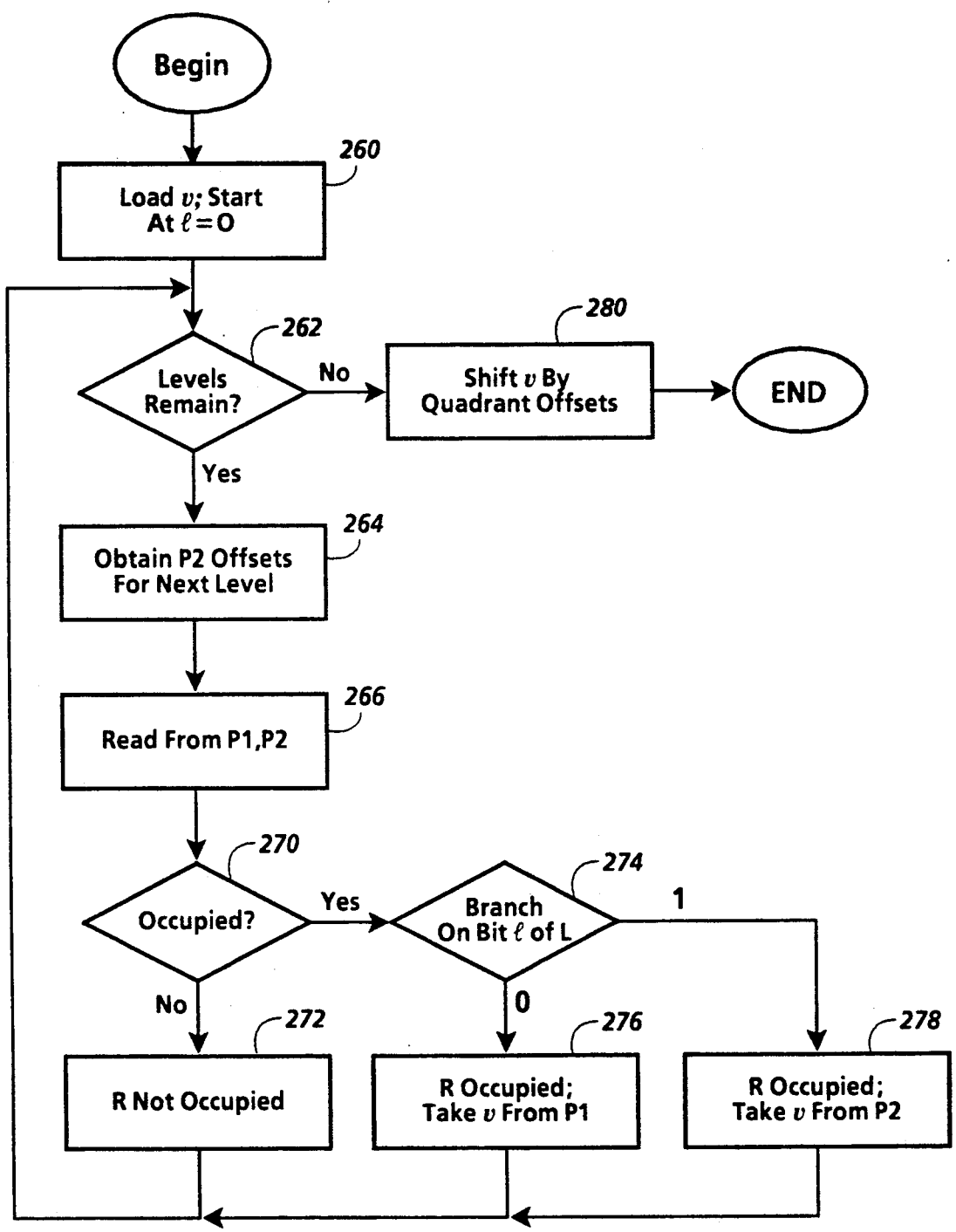
FIG. 12 is a flow chart showing steps in transmitting data from neighbors to owners using stored path data.
Figure 13:
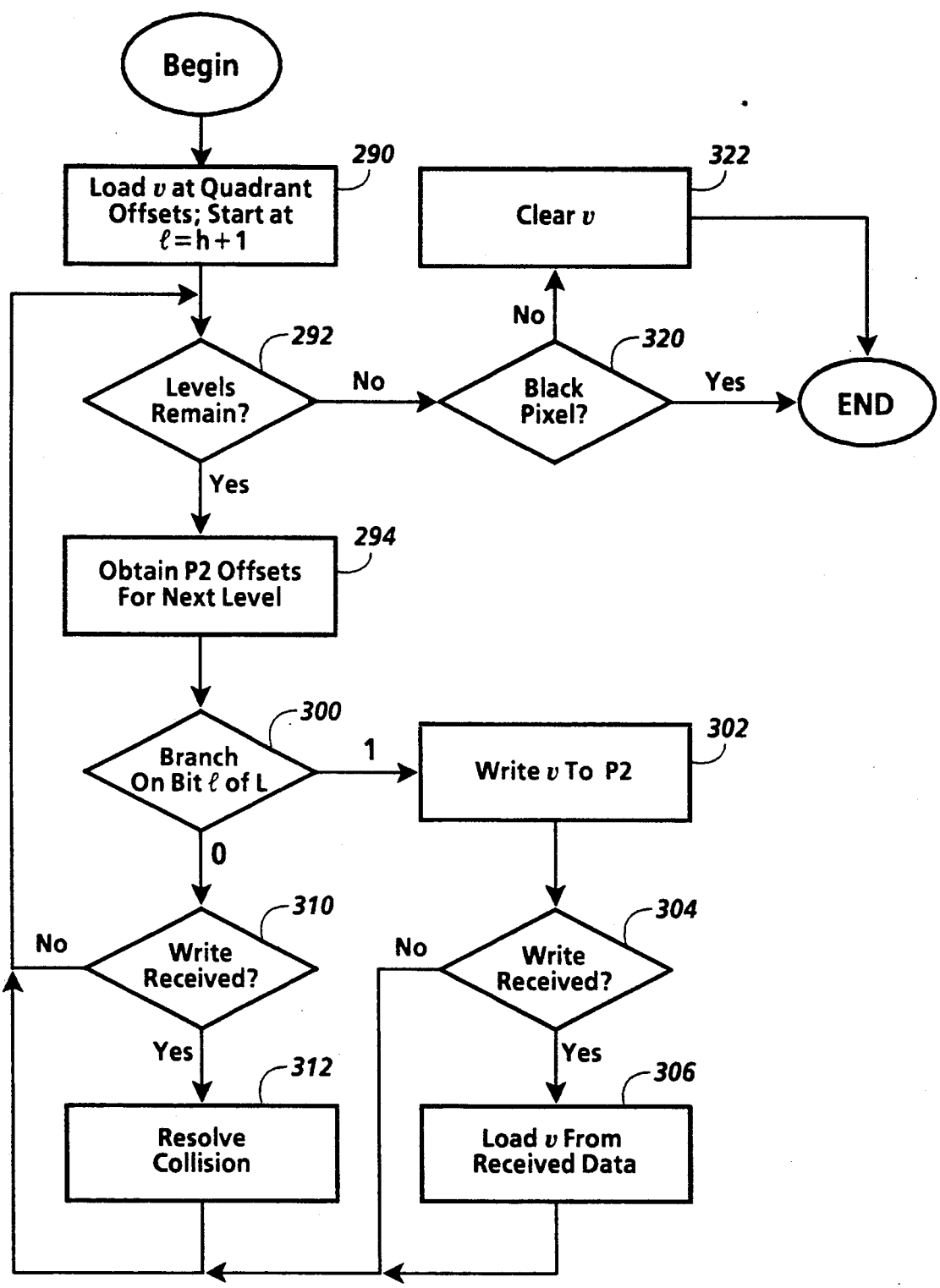
FIG. 13 is a flow chart showing steps in transmitting data from owners to neighbors using stored path data.

Once a bit vector for a given quadrant has been stored in the local memory of each processing unit, as described above in relation to box 236, data can be communicated from neighbor to owner or from owner to neighbor within the quadrant using the bit vector. FIG. 12 shows steps in communicating data from neighbor to owner and FIG. 13 shows steps in communicating data from owner to neighbor.

In FIG. 12, the step in box 260 begins by loading the data to be transmitted into v in the local memory of each processing unit and by initializing l to zero. The step in box 262 begins an iterative loop that is performed for each level of the hierarchy above the lowest level.

The first step in the iterative loop, in box 264, obtains the offsets to P2 from each processing unit on the next level l upward in the hierarchy. The step in box 266 then reads from P1 and P2 using the offsets obtained in box 264, to obtain v and also data indicating whether r1 and r2 are occupied. The step in box 270 branches based on whether r1 and r2 are occupied—at the lowest level, a black pixel is occupied and a white pixel is not. If neither is occupied, the step in box 272 stores data indicating that R is not occupied. If one or both are occupied, the step in box 274 branches on bit l of bit vector L. If bit l is a "0", data is stored to indicate that R is occupied and v is kept at its value for r1 from P1. If bit l is "1", data is stored to indicate that R is occupied and v is changed to the value for r2 from P2.

When all the levels have been handled, the step in box 280 shifts v by the offsets for the quadrant. This step is similar to box 240 in FIG. 11, except that no offset adjustment is necessary.

In FIG. 13, the step in box 290 begins by loading the data to be transmitted into v in the local memory of each processing unit, taking into account the offsets for the quadrant, and by initializing l to h+1. The step in box 292 begins an iterative loop that is performed for each level of the hierarchy down to l=1.

The first step in the iterative loop, in box 294, obtains the offsets to P2 from each processing unit on the next level l downward in the hierarchy. The step in box 300 branches based on bit l of bit vector L.

If bit l is a "1", the step in box 302 writes v to P2, using the offsets obtained in box 294. Then, the step in box 304 tests whether a write has been received from another processing unit performing the step in box 302. If so, the step in box 306 loads v based on the received data before returning to the step in box 292.

If bit l is a "0", the step in box 310 tests whether a write has been received from another processing unit performing the step in box 302. If so, the step in box 312 resolves the collision before returning to the step in box 292. Collisions can occur in writing from owners to neighbors because each black pixel may be defined by the linking algorithm to be the neighbor of more than one owner pixel for a particular quadrant; typically, a black pixel will have many owners. A collision occurs whenever two owners write data to the same neighbor or to a shared processing unit on the paths to a shared neighbor. The standard methods for dealing with collisions in parallel computations—such as accepting only the first value to arrive, allowing later arrivals to overwrite previous values, or combining all colliding values with functions such as the maximum or minimum—could be used here.

In addition to resolving collisions, it may be necessary for the step in box 312 to check whether a collision has actually occurred. If a "0" is loaded into L at each level at which R is not occupied, as noted above in relation to box 236 in FIG. 11, the step in box 312 is only reached when R is occupied, which avoids spurious collisions, and no collisions will occur when bit l of L is a "1", as implicitly assumed in FIG. 13. Collisions can also be avoided by writing from only one owner to its neighbor, in which case the data being written can include a code to indicate to the step in box 312 which data to save in case of collision.

3. Labeling Pixels

Some image processing operations require that each of a set of processing units has a certain value, called a "label," in a specified field of its local memory. For example, image analysis operations that compute shape properties and spatial relations or that recognize objects typically focus on meaningful scene entities that each include a set of many pixels. Such operations can be performed in parallel if the processing unit for each pixel in a set has a label indicating that the pixel is in the set.

Component labeling operations, important basic operations for separating figure from ground, are crucial to most such image analysis operations. A component labeling operation spreads a label iteratively from one or more seed pixels to a set of pixels that meet a component criterion. The set can include all other pixels that can be reached from the seed pixels under a local criterion that determines whether or not two neighboring pixels are in the same component. Boundary tracing and region coloring (or region growing) are common examples of component labeling operations, and in their typical forms they label connected components—that is, the criterion for labeling a given pixel requires that it be adjacent to an already-labeled pixel.

Figure 14:
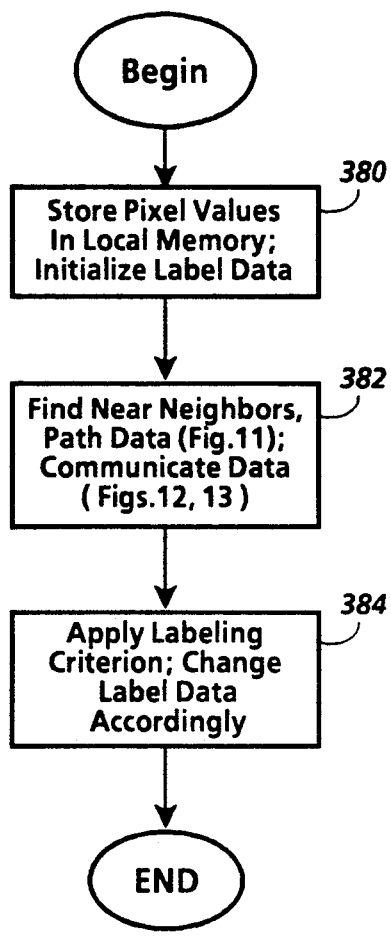
FIG. 14 is a flow chart showing general steps in labeling a set of pixels based on near neighbor data.

FIG. 14 shows steps of an operation that performs labeling in a different way, based on near neighbor data. The general technique finds each pixel's near neighbors and applies a criterion to determine whether the pixel should be in a set. The step in box 380 stores the pixel values of the image being analyzed in memory, with each processing unit's local memory containing the respective pixel's value. Also, the step in box 380 initializes each processing unit's label data, which could be done by clearing all the label data or by setting the label data of one or more pixels to serve as seed pixels. The step in box 382 finds near neighbors by producing a hierarchy of near neighbor data items, as described above in relation to FIG. 11. Path data may also be stored, and data may be communicated using the path data, as described above in relation to FIGS. 12 and 13. The step in box 384 applies a labeling criterion to the data at each processing unit to determine whether it should be in the labeled set. If so, the processing unit's label data is changed accordingly.

The general steps in FIG. 14 could be used in many different image analysis operations. The next three sections describe three general types of such operations.

4. Component Labeling

Figure 15:
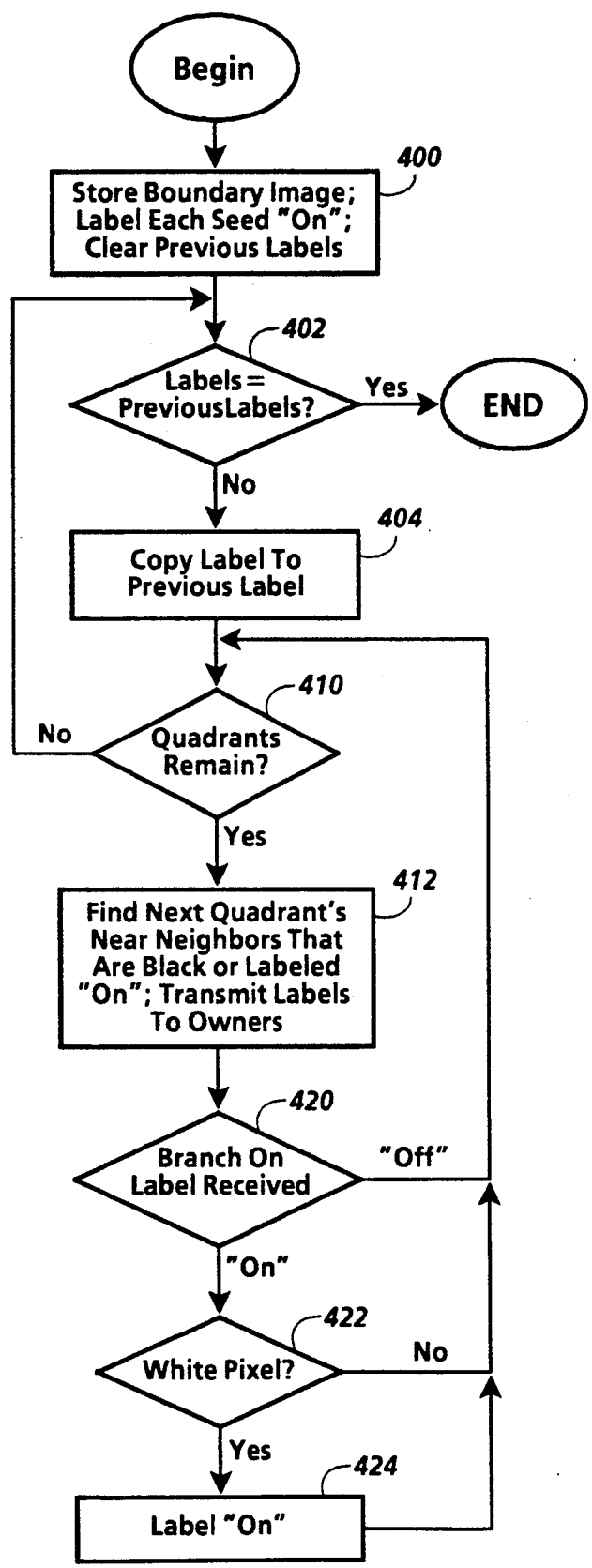
FIG. 15 is a flow chart showing steps in labeling pixels in a component enclosed by a boundary.
Figure 16:
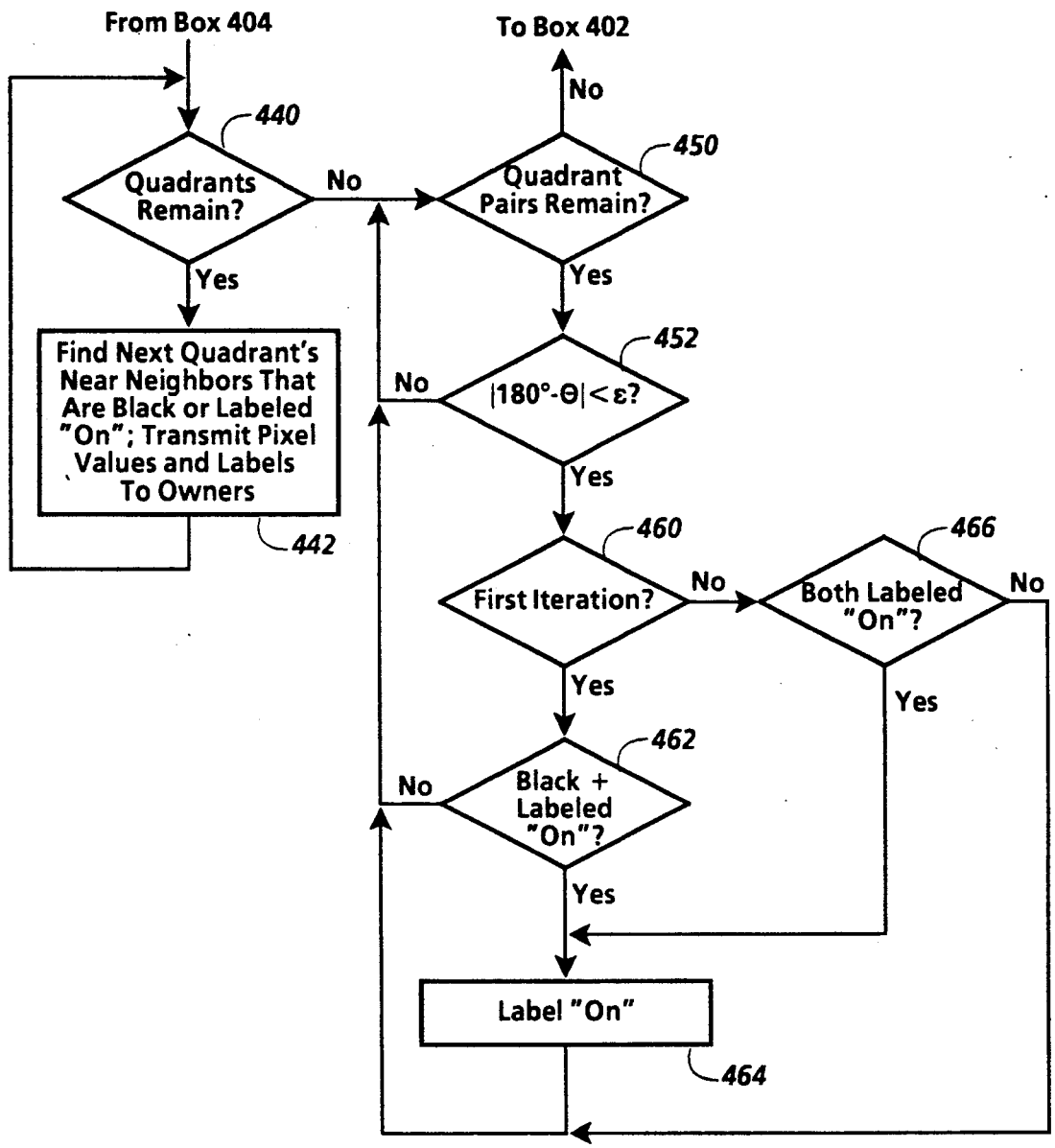
FIG. 16 is a flow chart showing steps in labeling pixels in a partially bounded region.

Component labeling was mentioned above as an example of an operation that labels a set of pixels. FIG. 15 shows how near neighbor operations can be used to label a component enclosed by a boundary. FIG. 16 shows how near neighbor operations can be used to label a component that is only partially bounded.

The general approach of the labeling operation in FIG. 15 is to apply a visibility criterion to near neighbor links of every pixel in parallel. Starting with a boundary and one or more interior seed pixels, each pixel is treated as an interior pixel if it has a near neighbor link to an interior pixel.

The step in box 400 begins by storing pixel values of an image in which the boundary pixels are black and the pixels enclosed by the boundary are white, with each processing unit's local memory containing the respective pixel's value. Also, a Label bit in the local memory of each processing unit is set "on" if its respective pixel is a seed pixel and a Previous Label bit is cleared for all processing units.

The step in box 402 begins an iterative loop that continues until one of the iterations produces no change in the set of processing units whose Label bits are "on." This is determined by comparing each processing unit's Label bit with its Previous Label bit. If there is a difference in any of the processing units, the step in box 404 copies each processing unit's Label bit to be its Previous Label bit.

The step in box 410 begins an iterative loop that finds near neighbors for each quadrant. The step in box 412 finds near neighbors in the next quadrant, applying the criterion that a neighbor must either be black in the image of the boundary or must have its Label bit "on." The step in box 412 also transmits the Label bit of each neighbor to its owners as part of the operation of producing the hierarchy of near neighbor data items. The step in box 414 then branches, at each processing unit, based on the Label bit received from its neighbor. If the received Label bit is "on," as determined in box 420, and the processing unit's respective pixel in the image of the boundary is white, as determined in box 422, then the step in box 424 sets the processing unit's Label bit to be "on."

The steps in FIG. 15 label every connected white region in the image that contains a seed location. If a region that contains a seed location is only partially bounded, the steps in FIG. 15 label pixels outside the boundary, because they are connected to pixels inside the boundary. Connected component labeling operations as in FIG. 15 are therefore not robust across typical applications, because image curves are often not connected and region boundaries are often not closed. It is possible, however, to define operationally the interior of a boundary with gaps or a partial region between an open curve and a given point, using near neighbor links and a directional notion of enclosure that simply involves examining pairs of links at every location in parallel. A pixel may be treated as directionally enclosed if the relative orientation of two of its near neighbor links is within an angle $\epsilon$ of 180°. FIG. 16 shows steps of a labeling operation that uses this approach, defining a point as an interior point if it is directionally enclosed by either (i) an interior pixel and a boundary pixel or (ii) two interior pixels.

The labeling operation in FIG. 16 includes steps that are substantially the same as the steps in boxes 400, 402, and 404 in FIG. 15. The steps in FIG. 16 begin after the step in box 404.

The step in box 440 begins the first of two inner iterative loops. The step in box 442 finds the near neighbors for each quadrant, applying the criterion that a neighbor must either be black in the image of the boundary or must have its Label bit "on." The step in box 442 also transmits the pixel value in the image of the boundary and the Label bit of each neighbor to its owners as part of the operation of producing the hierarchy of near neighbor data items.

When the near neighbors have been found in all quadrants, the step in box 450 begins a second inner iterative loop that considers all possible pairs of quadrants. The step in box 452 determines whether, for the next pair of quadrants, the links are separated by an angle $\theta$ that is within $\epsilon$ of 180°, so that the pixel is directionally enclosed. If so, the step in box 460 branches based on whether this the first iteration of the outer iterative loop. If so, the step in box 462 determines whether the near neighbors in this pair of quadrants include one pixel that is black in the image of the boundary and another pixel whose Label bit is "on." If so, the step in box 464 sets the processing unit's Label bit to be "on." If this is a subsequent iteration of the outer loop, the step in box 466 determines whether the near neighbors are both pixels whose Label bits are "on," in which case the step in box 464 is performed.

When all possible pairs of quadrants have been considered, the labeling operation returns to box 402. When an iteration of the outer loop fails to change the Label of any pixel to "on," the operation ends.

The component defined by the operation of FIG. 16 depends on the number and locations of seed pixels and on the constraint $\epsilon$. The successful implementation of this operation illustrates that a partially bounded component can be labeled based on near neighbor operations, but may not be reliable in the face of arbitrarily noisy boundary data. A more reliable scheme would probably involve additional criteria for deciding whether this approach is applicable to a given situation or how the results should be interpreted.

5. Linked Group Labeling

A "linked group" of pixels may be defined as a set of pixels connected by a specified set of pixel links. As discussed below, a variety of grouping operations can be performed to produce data defining a set of pixel links, including operations applying criteria such as proximity, similarity, and so on. The pixel links can be found by first finding near neighbor links. A grouping operation selects a set of pixel links whose linked pixels are both black pixels; the grouping operation labels the selected pixel links. Labeling a linked group can be thought of as connected component labeling on a graph where the grouped components are the nodes and the selected pixel links are the edges.

Figure 17:
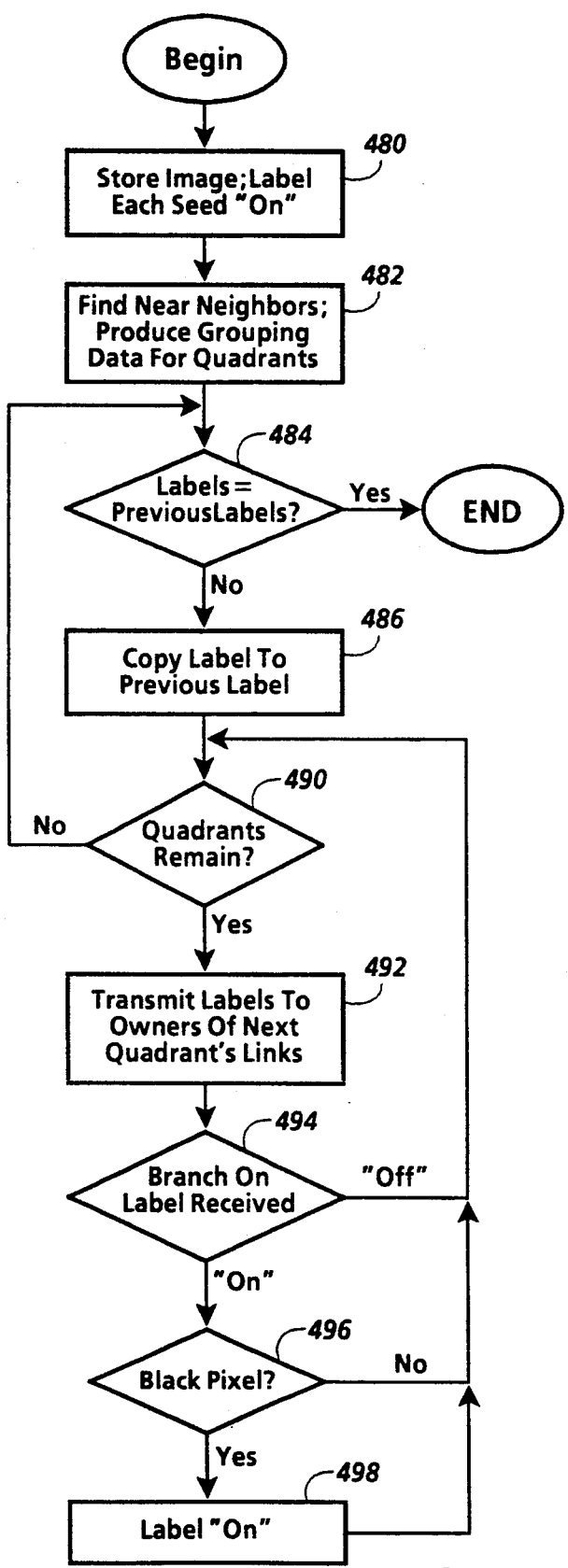
FIG. 17 is a flow chart showing steps in labeling a group of linked pixels.

FIG. 17 shows steps in a linked group labeling operation. The step in box 480 stores the pixel values of an image so that each processing unit's local memory contains the respective pixel's value. The Label bit of each processing unit whose respective pixel is a seed pixel is set "on," the connected components that include seed pixels are colored, and Previous Label is cleared.

The step in box 482 finds near neighbors and produces grouping data for each of the quadrants. Operations for implementing this step are discussed in more detail below in relation to FIG. 18.

The step in box 484 begins an iterative loop that continues until one of the iterations produces no change in the set of processing units whose Label bits are "on." This is determined by comparing each processing unit's Label bit with its Previous Label bit. If there is a difference in any of the processing units, the step in box 486 copies each processing unit's Label bit to be its Previous Label bit.

The step in box 490 begins an inner iterative loop that considers the grouping data for each quadrant. The step in box 492 uses neighbor to owner communication to transmit the value of each pixel's Label bit to its owners by following the links that have link labels indicating that they are in a linked group. The step in box 494 then branches based on the Label value received in box 492. If "on" is received, the step in box 496 determines whether the processing unit's respective pixel is black and, if so, the step in box 498 sets the processing unit's Label bit to "on" and colors connected components that include pixels whose Label bits are "on."

Figure 18:
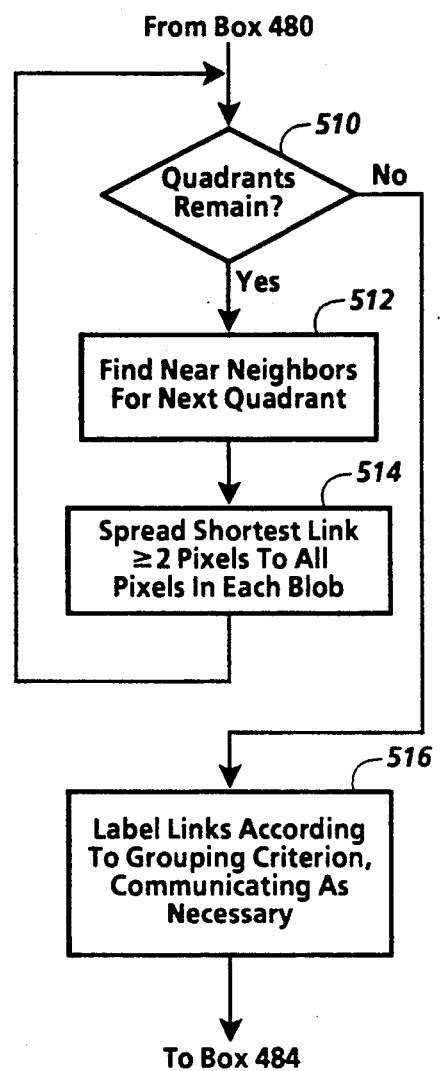
FIG. 18 is a flow chart showing steps in labeling links in the operation of FIG. 17.

FIG. 18 shows how the step in box 482 in FIG. 17 can be implemented if each black pixel in the image being analyzed is in one of a set of isolated connected blobs. The step in box 510 begins an iterative loop that is performed for each quadrant. The step in box 512 finds near neighbors for the next quadrant, using the steps in FIG. 11.

The step in box 514 spreads the shortest link in each blob that is equal to or greater than two pixels in length to all the other pixels in the blob. This step is necessary because, for any blob or other figure larger than a single pixel, the links to neighboring figures occur at different pixels within the figure. The step can be performed using a generalization of the hierarchical connected component labeling process described in copending coassigned U.S. patent application Ser. No. 07/535,796, entitled "Dense Aggregative Hierarachical Techniques for Data Analysis." The minimum distance is first moved to the upper-left corner pixel of a square region that includes only one blob, together with respective values of other attributes of links, such as offsets and orientation. The minimum distance value and the respective values of the other variables are then spread from the upper left corner of the region to all pixels of the blob in the region.

The step in box 516 then applies a criterion to the link at each pixel to find the links that are to be labeled as selected links. Each processing unit, for each quadrant, has a Link Label bit that is set for pixels whose links in that quadrant are selected. In applying the criterion, it may be necessary to communicate between processing units. If communication between processing units of different blobs is performed, the communicated data must be distributed to all of the pixels of the blob that received the data.

The grouping operation in FIG. 18 sets the Link Label bit of the processing units of a subset of the black pixels in the image to be "on," but does not set the Link Label bit of any of the white pixels to be "on." A wide variety of selection criteria may be applied. The criteria discussed below all assume that the shortest link within each blob has been spread as discussed above in relation to box 514.

One example of a selection criterion is the nearest neighbor criterion. This criterion selects, at each pixel, the link for which the distance to the neighbor is the minimum.

The angular nearest neighbor criterion selects, at each pixel, the link that is most nearly aligned with a specified reference direction $\theta_R$. The angular nearest neighbor is the neighbor associated with the link for which the acute orientation difference with $\theta_R$ is minimized.

The mutuality criterion selects, at each pixel, a link that is mutual with another pixel. In other words, pixels a and b are mutual neighbors if b is a neighbor of a and a is a neighbor of b. In this case, a and b will be neighbors of each other in opposing quadrants. The first and third quadrants are opposing and the second and fourth quadrants are opposing. Therefore, a mutual link can be found by transmitting link offsets in a given quadrant from each neighbor pixel to its owner pixels, and then comparing the received offsets at each pixel with its link offsets in the opposing quadrant—if the absolute values of the offsets are equal, the link is labeled as mutual.

Mutual links seem to be especially salient in capturing the organization in an image, perhaps because they provide information about undirected relationships between pixels. The remaining criteria discussed below start with mutual links distributed to all the pixels in a blob in the manner discussed above in relation to box 514.

The proximity grouping criterion defines clusters of elements using local neighbor distances alone. It is based on the intuition that cluster boundaries are locations of abrupt change in the distance between neighbors—that is, link-lengths vary slowly within a cluster but change abruptly at the boundaries between clusters.

In one dimension, for example, each point has links to its neighbor on the right and its neighbor on the left. Cluster boundaries are introduced at those points at which one link is too much longer than the other. A cluster boundary is introduced by deselecting the longer of the two links at these points, and then deselecting links for which the mutual link has been deselected.

This scheme may be extended to two dimensions by applying the above test to every pairing of the shortest link at a given location with every other link at that location. The distance similarity of two links can be measured by a quadratic formulation that reflects the subjective observation that in human proximity grouping the negative effect of local differences in neighbor distance seems to increase with the distances: links l1 and l2 with distances d(l1) and d(l2) are too different if $$\frac{(d(l1) - d(l2))^2}{d(l1) + d(l2)} > k$$

where k is a parameter in the computation.

Sensitivity to scale may be controlled by the following modification: a link l1 at pixel p is deselected if $d(l1) > k \max(d(l2), D)$, where l2 is the shortest link at p and D is a global parameter. D may be set, for example, based on the length of the longest link in the image, or the most common link length.

The colinearity grouping criterion defines clusters of elements based primarily on local neighbor orientations. It involves a two-stage test. In the first stage, any pair of links l1 and l2 at a pixel are both selected if (i) l1 and l2 are both mutual links; and (ii) l1 and l2 are sufficiently aligned. In human colinearity grouping, the negative effect of local differences in neighbor orientation seems to increase with the neighbor distance. In measuring alignment of two links, the acute orientation difference between the two links is therefore allowed to range from some maximum $\delta\theta_{max}$ at the minimum distance of 1 pixel to 0 at some maximum distance $D_{max}$ which is a sensitivity parameter in the computation. Thus one formulation of the alignment of l1 and l2 is the following:

$$d_\theta(o(l1),o(l2)) < \delta\theta_{max}\left(1 - \frac{\min(\max(d(l1),d(l2)),D_{max})}{D_{max}}\right).$$

In the second stage, an unselected link l is selected if (i) it is a mutual link and (ii) its inverse link was selected in the first stage. The second stage selects terminal links of colinear groups.

The similarity grouping criterion may be applied alone or in addition to the proximity and colinearity criteria. We are given an array of values spatially registered with the binary image that was input to the neighbor linking process. This array might label pixels with values of some local geometric property, for example. The link l(a, b) in which b is the neighbor and a is the owner is selected if the value at b is similar enough to the value at a. To apply this test, the value at b must be transmitted to a.

The alignment grouping criterion applies when an orientation is defined—by some independent process—at each black pixel. It combines aspects of the colinearity and similarity grouping criteria. If b is a neighbor of a, linked by l, and the orientations at a and b are $\theta_a$ and $\theta_b$, a is aligned with b if $$d_\theta(o(l),\theta(a)) < \delta\theta_{max}\left(1 - \frac{\min(d(l),D_{max})}{D_{max}}\right)$$

and $$d_\theta(o(l),\theta(b)) < \delta\theta_{max}\left(1 - \frac{\min(d(l),D_{max})}{D_{max}}\right).$$

Grouping on the basis of parallelism is closely related to alignment grouping and may be defined in a similar way. In the case of parallelism, it is necessary to establish that the differences between the pixel orientations and the link orientation tend toward 90°, rather than toward 0°.

6. Symmetry Point Labeling

Local symmetries of region boundaries provide a stage of description that is intermediate between the pointwise description of the region boundaries and a concise description of the region's overall properties. The set of local symmetry points of a region—often termed the skeleton—is a pointwise description in which each element captures extended measures on the region, such as local width and orientation. From this description, it is possible to compute region properties such as length and maximum, minimum, or average values of width, taper, bending, and skew.

Figure 19:
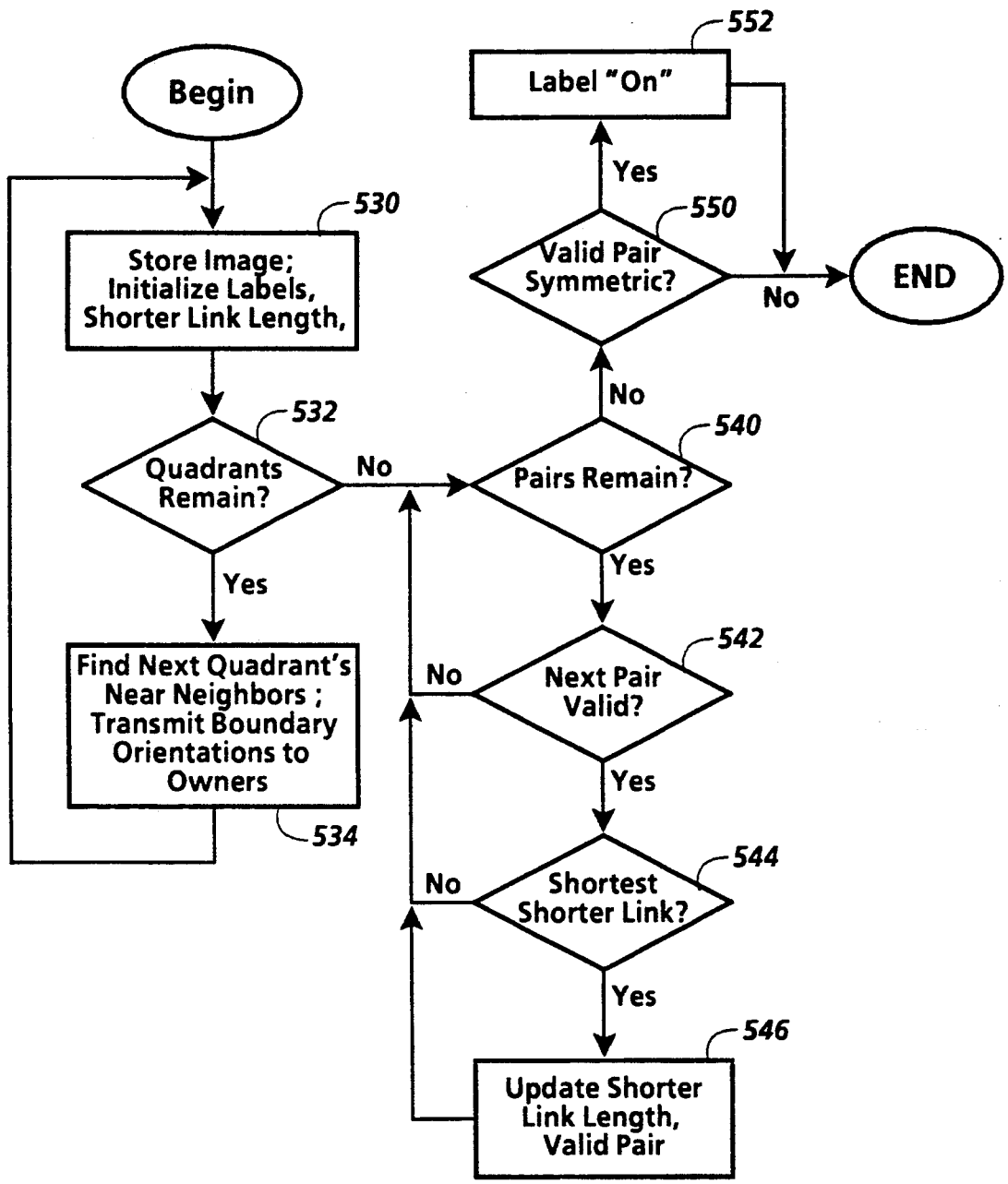
FIG. 19 is a flow chart showing steps in labeling symmetry pixels.

FIG. 19 shows steps of a symmetry point labeling operation based on near neighbor data. The step in box 530 begins by storing an image, with each processing unit's local memory containing the respective pixel's value and a cleared Label bit and a field Shorter Link Length initialized to the longest possible link length.

The step in box 532 begins a first iterative loop that, for each quadrant, finds the near neighbors, in box 534. The step in box 534 can also transmit the boundary orientation at each neighbor, if any, to its owners.

The step in box 540 begins a second iterative loop that, in box 542, for each pair of quadrants, determines whether the respective links are a valid pair. It is important to avoid computing a result based on pairs of links that do not contain adequate information. This is the case when (i) any of the neighbor distances of interest is small relative to the pixel size; or (ii) the angle between two links is small, implying that the links straddle a quadrant boundary. Thus, for all the local symmetry computations presented here, a pair of links (l1, l2) is valid only if $d(l1) > d_{min}$, $d(l2) > d_{min}$, and the acute orientation difference $\delta_\theta(\theta(l1), \theta(l2)) > \theta_{min}$, where $d_{min}$ and $\theta_{min}$ are constants. Pairs of links that do not meet these restrictions are not meaningful for symmetry detection and are not considered further.

If a pair is valid, the step in box 544 determines whether its shorter link is shorter than the shortest previous shorter link. If so, the stored Shorter Link Length is updated and data is stored indicating that the valid pair is the pair with the shortest shorter link so far, in box 546. When all the pairs have been considered, the step in box 550 applies a local symmetry criterion to the valid pair with the shortest shorter link found in box 544. If the pair meets the criterion, the step in box 552 changes the processing unit's Label bit to "on" before ending. Two symmetry criteria that can be used in box 550 are a position symmetry criterion and an orientation symmetry criterion.

A pixel p has position symmetry if it has a valid pair of links with a small enough difference in length. If p has links l1 to a and l2 to b, then p has position symmetry if $-\epsilon < d(l1) - d(l2) < \epsilon$, where $\epsilon$ is a parameter of the computation. The set of pixels satisfying this criterion is a crude approximation to the Voronoi diagram for a set of isolated black pixels, and an approximation to the symmetric axis transform for a set of curves or regions. It is a crude approximation because (i) when the black pixels that are neighbors of a true symmetry point both fall within the same quadrant, only one of them is explicit in the linked image representation; and (ii) the near neighbor in a quadrant is not guaranteed to be the Euclidean nearest neighbor in that quadrant.

A simple orientation symmetry criterion adds a tangency constraint to the position symmetry criterion, thus eliminating some of the less salient position symmetries. It applies when the input image consists of a set of boundaries, and a local boundary orientation is defined—by some independent process—at each boundary pixel. A pixel has orientation symmetry if it has position symmetry and the orientation values at the neighbor pixels are nearly orthogonal to the link orientations. That is, p is an orientation symmetry if it is a position symmetry and if the following apply: $90 - \epsilon < \delta_\theta(\theta_a, \theta(l)) < 90 + \epsilon$ and $90 - \epsilon < \delta_\theta(\theta_b, \theta(l)) < 90 + \epsilon$.

D. Source Code Appendix

Appendix A is source code for implementing some of the features described above. The source code in Appendix A may differ in some respects from the above description, but execution of the source code in Appendix A on a Connection Machine provides substantially all the features described above. In some cases, the code has been optimized or includes additional features. Source code for implementing other features is included in copending coassigned U.S. patent applications Ser. Nos. 07/535,438, entitled "Exhaustive Hierarchical Near Neighbor Operations on an Image" and 07/535,796, entitled "Dense Aggregative Hierarchical Techniques for Data Analysis," both of which are incorporated herein by reference in their entirety.

The following are included in Appendix A:

The functions named GROUP-XXXX perform grouping operations, except for GROUP-SYMMETRIC, which performs local symmetry labeling.

The function COLOR-FROM-SEED performs labeling of a connected component or a group of connected components.

The function FLOAT-PROJECT-VALUE-LIST propagates link data across a valid chunk, using a generalization of the hierarchical connected component labeling process described in the architecture application.

E. Miscellaneous

The invention has been described in terms of operations on binary images, but could be applied to images of all types and, more generally, to bodies of data that map into arrays similar to those described.

An implementation of the invention has been described that employs in-place computation as described in the architecture application. The invention could also be implemented with the Binary Image Jungle (BIJ) described in the architecture application, if connections were provided for communicating directly across x and y offsets in both positive and negative directions. A simple way of supporting the full linking computation on a BIJ is to give each parent node at level 1 an additional child with offsets $(2^{(l-1)/2}, 0)$ at odd levels and $(0, 2^{(l/2)-1})$ at even levels. In other words, the number of connections at each processor could be increased from two to three.

Although the invention has been described in relation to various implementations, together with modifications, variations and extensions thereof, other implementations, modifications, variations and extensions are within the scope of the invention. The invention is therefore not limited by the description contained herein or by the drawings, but only by the claims.

APPENDIX A

```
;;;-*- Syntax: Common-lisp; mode: lisp; package: REVERSE-GRAPHICS; base: 10-*-

;;;
;;; This file contains grouping and local symmetry detection operations.
;;;

;;; For all operations in this file, the argument active is a 1-bit
;;; field pvar.

;;; The argument link-pvars, xoff-pvars, yoff-pvars, dist-pvars,
;;; angl-pvars mnnp-pvars, and group-pvars are lists of four field
;;; pvars.

;;; mnnp-pvars and group-pvars contain 1-bit field pvars.

;;; Each pvar in link-pvars has one bit for every level in the hierarchy.

;;; xoff-pvars, yoff-pvars, dist-pvars, angl-pvars contain field pvars
;;; long enough to hold, repectively, any x offset, y offset, distance,
;;; or orientation.

;;; The argument links is a data structure containing all link data
;;; (link-pvars, xoff-pvars, yoff-pvars, dist-pvars, angl-pvars) for all
;;; quadrants.

;;; Operations with the prefix GROUP- in their name are top-level
;;; operations which expect to be passed the precomputed links, and then
;;; label them in some result pvars (say mnnp-pvars or group-pvars)
;;; which must be passed.

;;;----------------------------------------------------------------
;;; establishing mutual proximity ;; This operation implements the heart of the mutuality grouping process.

(defun establish-mutual-quad-neighbors
     (active link-pvars xoff-pvars yoff-pvars mnnp-pvars)
  (noting-progress ("Mutual Links")
    (loop for link-pvar in link-pvars
        for mnnp1-pvar in mnnp-pvars
        for xoff1-pvar in xoff-pvars
        for yoff1-pvar in yoff-pvars
        for quad1 from 1 do
     (note-progress quad1 4)
     (*locally
      (declare (type (field-pvar 1) mnnp1-pvar)
           (type (field-pvar (pvar-length xoff1-pvar)) xoff1-pvar yoff1-pvar))
      (*set mnnp1-pvar (!! 0))
      (let* ((quad2 (opposing-quad quad1))
           (xoff2-pvar (nth (1- quad2) xoff-pvars))
           (yoff2-pvar (nth (1- quad2) yoff-pvars)))
        (*let (neighbor-xoff-pvar neighbor-yoff-pvar)
         (declare (type (field-pvar 16) neighbor-xoff-pvar neighbor-yoff-pvar))
```

```
      (read-link active link-pvar xoff2-pvar neighbor-xoff-pvar quad1)
      (read-link active link-pvar yoff2-pvar neighbor-yoff-pvar quad1)
      (*when (or!! (plusp!! xoff1-pvar) (plusp!! yoff1-pvar))
       (case (+ quad1 quad2)
        ((4 6)
         (*when (and!! (=!! neighbor-xoff-pvar xoff1-pvar)
                       (=!! neighbor-yoff-pvar yoff1-pvar))
          (*set mnnp1-pvar (!! 1))))))))))))).
```

;;

```
(defun suppress-internal-links
       (dist-pvars group-pvars &optional (thresh 2))
  (loop for group-pvar in group-pvars
        for dist-pvar in dist-pvars do
    (*when (<=!! dist-pvar (!!f thresh))
     (*set (fpvl group-pvar 1) (!! 0)))))
```

;; This operation propagates the initial links.

;; this assumes the internal links have been suppressed.
```
(*defun project-links
       (active xoff-pvars yoff-pvars dist-pvars angl-pvars group-pvars
        &optional (prop-stop-level top-chunking-level))
 (*let (max-valid-level)
   (declare (type (field-pvar 8) max-valid-level))
   (label-valid-scale active max-valid-level)
   (noting-progress ("Propagating links")
      (loop for group-pvar in group-pvars
            for dist-pvar in dist-pvars
            for xoff-pvar in xoff-pvars
            for yoff-pvar in yoff-pvars
            for angl-pvar in angl-pvars
            for q from 1 do
        (note-progress q 4)
        (float-project-value-list
          dist-pvar dist-pvar
          (list xoff-pvar yoff-pvar angl-pvar)
          (list xoff-pvar yoff-pvar angl-pvar)
          max-valid-level group-pvar active
          prop-stop-level)))))
```

;;

```
(defun project-group (active group-pvars)
  (*let (max-valid-level)
    (declare (type (field-pvar 8) max-valid-level))
    (label-valid-scale active max-valid-level)
    (loop for group-pvar in group-pvars do
      (float-project-value
        group-pvar group-pvar active max-valid-level))))
```

;; This is the top-level mutuality grouping operation.

```
(defun GROUP-MUTUAL (selected links mnnp-pvars group-pvars)
  (let ((link-pvars (link-path links))
        (xoff-pvars (link-xoff links))
        (yoff-pvars (link-yoff links))
```

```
      (dist-pvars (link-dist links))
      (angl-pvars (link-angl links)))
  (establish-mutual-quad-neighbors
    selected link-pvars xoff-pvars yoff-pvars mnnp-pvars)
  (suppress-internal-links dist-pvars mnnp-pvars)
  (project-links
    selected xoff-pvars yoff-pvars dist-pvars angl-pvars mnnp-pvars)
  (loop for mnnp-pvar in mnnp-pvars
        for group-pvar in group-pvars do
    (s1<-s2 group-pvar mnnp-pvar))
  (project-group selected group-pvars)))
```

;;;------------------------------------------------------------
;;; mutual activity ;;
;; ... for when you already know that two neighbors are mutual, and need
;; only to establish in addition that they are both active.
;;

```
(defun establish-mutual-active-quad-neighbors
       (active link-pvars group-pvars mgroup-pvars)
  (loop for link-pvar in link-pvars
        for mgroup1-pvar in mgroup-pvars
        for group1-pvar in group-pvars
        for quad1 from 1 do
    (*locally
      (declare (type (field-pvar 1) mgroup1-pvar group1-pvar))
      (*set mgroup1-pvar (!! 0))
      (let* ((quad2 (opposing-quad quad1))
             (group2-pvar (nth (1- quad2) group-pvars)))
        (*let (neighbor-group-pvar)
          (declare (type (field-pvar 1) neighbor-group-pvar))
          (read-link active link-pvar group2-pvar neighbor-group-pvar quad1)
          (*when (and!! (plusp!! group1-pvar) (plusp!! neighbor-group-pvar))
            (*set mgroup1-pvar (!! 1)))))))))
```

;;;------------------------------------------------------------
;;; establishing local similarity of token attributes using mnnp links ;; This operation implements the similarity grouping scheme.

;; expects mnnp already established
```
(defun GROUP-SIMILAR
       (value-pvar active links mnnp-pvars group-pvars
        &key tolerance (tolerance-factor default-similarity-scale-factor))
  (let ((link-pvars (link-path links)))
    (*locally
      (declare (type (field-pvar (pvar-length value-pvar)) value-pvar))
      (loop for group-pvar in group-pvars
            for mnnp-pvar in mnnp-pvars
            for link-pvar in link-pvars
            for quad from 1 do
        (*locally
          (declare (type (field-pvar 1) group-pvar mnnp-pvar))
          (*set group-pvar (!! 0))
```

```
      (*iet (neighbor-value-pvar)
        (declare (type (field-pvar 16) neighbor-value-pvar))
        (*set neighbor-value-pvar (!! 0))
        (read-link active link-pvar value-pvar neighbor-value-pvar quad)
        (*let (slop low high)
          (declare (type (field-pvar (pvar-length value-pvar)) slop low high))
          (if tolerance
            (*set slop (!!f tolerance))
            (*set slop (round!! (*!! value-pvar (!!r tolerance-factor)))))
          (*set low (max!! (-!! neighbor-value-pvar slop) (!! 0))
             high (+!! neighbor-value-pvar slop))
          (*when (plusp!! mnnp-pvar)
            (*when (inrange!! value-pvar low high)
              (*set group-pvar (!! 1))))))))
    (project-group active group-pvars))))

;;;-----------------------------------------------------------------
;;; adding an orientation alignment grouping constraint ;; allow 5 degrees at 100 pixels?
(defvar default-colinearity-tolerance 64.)

(*defun colinearity-fun!!
    (angl1 angl2 dist1 dist2
        &optional (tolerance default-colinearity-tolerance) (max-diff 90))
  (<=!! (fpv (*funcall #'orientation-difference-180!! angl1 angl2))
    (-!! (!!f max-diff)
      (*!! (/!! (min!! (max!! dist1 dist2))
              (!!f tolerance))
         (!!f tolerance))
      (!!f max-diff)))))

(defun establish-colinear-quad-neighbors
    (active link-pvars dist-pvars angl-pvars mnnp-pvars group-pvars
      &key
      (tolerance default-colinearity-tolerance)
      (colinearity-fun 'colinearity-fun!!))
  (loop for group1-pvar in group-pvars
    for dist1-pvar in dist-pvars
    for angl1-pvar in angl-pvars do
   (*locally
    (declare (type (field-pvar 1) group1-pvar)
        (type (field-pvar (pvar-length angl1-pvar)) angl1-pvar))
    (*set group1-pvar (!! 0))
    (loop for dist2-pvar in dist-pvars
      for angl2-pvar in angl-pvars do
    (*locally
      (declare (type (field-pvar (pvar-length angl2-pvar)) angl2-pvar))
      (unless (eq angl1-pvar angl2-pvar)
        (*when (and!! (plusp!! angl1-pvar) (plusp!! angl2-pvar))
          (*when (*funcall
              colinearity-fun
              angl1-pvar angl2-pvar dist1-pvar dist2-pvar tolerance)
        (*set group1-pvar (!! 1)))))))))
  (loop for group1-pvar in group-pvars
    for mnnp1-pvar in mnnp-pvars
    for link1-pvar in link-pvars
```

```
        for quad1 from 1 do
      (let* ((quad2 (opposing-quad quad1))
         (group2-pvar (nth (1- quad2) group-pvars)))
        (*let (neighbor-group-pvar)
        (declare (type (field-pvar 1) neighbor-group-pvar))
        (read-link active link1-pvar group2-pvar neighbor-group-pvar quad1)
        (*when (and!! (plusp!! mnnp1-pvar)
              (plusp!! neighbor-group-pvar))
          (*set group1-pvar (!! 1))))))))
```

;; This operation implements the colinearity grouping scheme.

```
(defun GROUP-COLINEAR
      (active links mnnp-pvars group-pvars
       &optional (tolerance default-colinearity-tolerance))
   (let ((link-pvars (link-path links))
      (dist-pvars (link-dist links))
      (angl-pvars (link-angl links)))
     (establish-colinear-quad-neighbors
       active link-pvars dist-pvars angl-pvars mnnp-pvars group-pvars
       :tolerance tolerance)
     (project-group active group-pvars)))
```

;; Variations on the stuff on this page could be use to detect any local
;; configuration in parallel. e.g., check the link lengths for
;; equality, check for two links symmetrically oriented about a third,
;; check for orthogonal, symmetric link pairs, etc.

```
;;;----------------------------------------------------------------
;;; token alignment/parallelism (orientation grouping)
;;;
```

;; Three orientations are involved in alignment: orientation at the
;; current token; orientation of the link to the neighbor; and
;; orientation of the neighbor token.
;; We could also enforce that (1) the signs of the two orientation
;; differences are the same, and or (2) that the magnitudes of the
;; two orientation differences are similar.

;; notice that maximum allowed difference is less for alignment than for
;; colinearity.
```
(*defun alignment-fun!!
      (theta angl dist
        &optional (tolerance default-colinearity-tolerance) (max-diff 45))
   (<=!! (fpv (*funcall #'orientation-difference-180!! theta angl))
     (-!! (!!f max-diff)
       (*!! (/!! (min!! dist (!!f tolerance))
            (!!f tolerance))
         (!!f max-diff)))))
```

;; This operation implements the alignment grouping scheme.

```
(defun GROUP-ALIGNED
      (theta-pvar active links mnnp-pvars group-pvars
       &key
       (alignment-fun #'alignment-fun!!)
```

```
            (tolerance default-colinearity-tolerance)
            (init? t))
     (let ((link-pvars (link-path links))
           (dist-pvars (link-dist links))
           (angl-pvars (link-angl links)))
       (loop for link-pvar in link-pvars
             for group-pvar in group-pvars
             for mnnp-pvar in mnnp-pvars
             for dist-pvar in dist-pvars
             for angl-pvar in angl-pvars
             for quad from 1 do
         (*locally
           (declare (type (field-pvar 1) mnnp-pvar group-pvar)
               (type (field-pvar (pvar-length angl-pvar)) angl-pvar))
           (if init? (*set group-pvar (!! 0)))
           (*let (neighbor-theta-pvar)
             (declare (type (field-pvar 16) neighbor-theta-pvar))
             (*set neighbor-theta-pvar (!! 0))
             (read-link active link-pvar theta-pvar neighbor-theta-pvar quad)
             (*when (and!!
                      (plusp!! mnnp-pvar)
                      (fpv (*funcall
                             alignment-fun theta-pvar angl-pvar dist-pvar tolerance))
                      (fpv (*funcall
                             alignment-fun neighbor-theta-pvar angl-pvar dist-pvar tolerance)))
               (*set group-pvar (!! 1)))))))
     (project-group active group-pvars))

;;;------------------------------------------------------------------
;;; proximity grouping
(defvar default-clustering-factor 3)
(defvar default-max-factor 0)

;;

(defun dist-max (active dist-pvars &optional group-pvars)
  (*let (dist)
    (declare (type (field-pvar 16) dist))
    (loop for dist-pvar in dist-pvars
          for group-pvar in group-pvars
          do (if group-pvars
                 (*set dist (if!! (plusp!! (fpvl group-pvar 1)) (fpv dist-pvar) (!! 0)))
                 (*set dist (fpv dist-pvar)))    •
          maximize (readout-max dist active))))

(*defun clustering-fun!! (d1 d2 k)
  (<=!! (/!! (*!! (-!! d1 d2)
                  (-!! d1 d2))
             (+!! d1 d2))
        (!!r k)))

(defun establish-cluster-boundaries
       (active mnnp-pvars dist-pvars group-pvars
        &optional
        (clustering-factor default-clustering-factor)
        (max-factor default-max-factor)
```

```
        (clustering-fun #'clustering-fun!!))
    (let* ((maxl (dist-max active dist-pvars mnnp-pvars))
           (minlength (round (* maxl max-factor))))
      (*let ((mindist-pvar (!! (expt 2 15))))
        (declare (type (field-pvar 16) mindist-pvar))
        (loop for group-pvar in group-pvars
              for dist-pvar in dist-pvars do
          (*locally
            (declare (type (field-pvar 1) group-pvar)
                     (type (field-pvar (pvar-length dist-pvar)) dist-pvar))
            (*set group-pvar (!! 0))
            (*when (plusp!! dist-pvar)
              (*set mindist-pvar (min!! dist-pvar mindist-pvar)))))
        (*set mindist-pvar (max!! mindist-pvar (!!f minlength)))
        (loop for group-pvar in group-pvars
              for mnnp-pvar in mnnp-pvars
              for dist-pvar in dist-pvars do
          (*locally
            (declare (type (field-pvar 1) group-pvar)
                     (type (field-pvar (pvar-length dist-pvar)) dist-pvar))
            (*when (and!! (plusp!! mnnp-pvar)
                          (plusp!! dist-pvar)
                     (*funcall clustering-fun
                         dist-pvar mindist-pvar clustering-factor))
              (*set group-pvar (!! 1))))))))

;; This operation implements the proximity grouping scheme.
(defun GROUP-PROXIMAL
       (active links mnnp-pvars group-pvars
        &optional
        (clustering-factor default-clustering-factor)
        (max-factor default-max-factor))
  (let ((link-pvars (link-path links))
        (dist-pvars (link-dist links)))
    (*let-fields temp-pvars 4 1
      (establish-cluster-boundaries
        active mnnp-pvars dist-pvars temp-pvars
        clustering-factor max-factor)
      (establish-mutual-active-quad-neighbors
        active link-pvars temp-pvars group-pvars)
      (project-group active group-pvars))))

;;; Using Links To Define Local Symmetry Axes
;;; ----------------------------------------------------------------

(defvar default-symax-diff-threshold 1.)
(defvar default-symax-dist-threshold 5.)
(defvar default-symax-tangent-threshold 45.)
(defvar default-symax-angl-threshold 110.)
(defvar default-symax-symm-threshold 30.)

(defun label-local-symmetries
       (active orientation link-pvars dist-pvars angl-pvars symax-pvar symm-link-pvars
        &optional
        (diff-thresh default-symax-diff-threshold)
        (tangent-thresh default-symax-tangent-threshold)
```

```
       (angl-thresh default-symax-angl-threshold)
       (symm-thresh default-symax-symm-threshold)
       (dist-thresh default-symax-dist-threshold))
  (*set (fpv symax-pvar) (!! 0))
  (with-neighbor-values (active link-pvars orientation neighbor-orientation-pvars)
    (*let ((symmquad1 (!! 0)) (symmquad2 (!! 0)) (symmdist (!!f (expt 2 15))))
      (declare (type (field-pvar 8) symmquad1 symmquad2)
          (type (field-pvar 16) symmdist))
      (loop for dist1-pvar in dist-pvars
         for angl1-pvar in angl-pvars
         for q1 from 1 do
       (loop for dist2-pvar in dist-pvars
          for angl2-pvar in angl-pvars
          for q2 from 1 do
        (*locally
         (declare (type (field-pvar (pvar-length dist1-pvar)) dist1-pvar dist2-pvar))
         (*let ((theta1 (orientation-difference-180!!
              angl1-pvar (nth (1- q1) neighbor-orientation-pvars)))
            (theta2 (orientation-difference-180!!
              angl2-pvar (nth (1- q2) neighbor-orientation-pvars))))
          (declare (type (field-pvar 8) theta1 theta2))
          (unless (= q1 q2)
           (*let ((dist (min!! dist1-pvar dist2-pvar)))
            (declare (type (field-pvar 16) dist))
            (*when (and!! (>!! dist1-pvar (!!f dist-thresh))
                  (>!! dist2-pvar (!!f dist-thresh))
                  (>=!! (orientation-difference!! angl1-pvar angl2-pvar)
                    (!!f angl-thresh)))
             (*when (<!! dist symmdist)
              (*set symmdist dist symmquad1 (!! 0) symmquad2 (!! 0)))
             (*when (and!! (<=!! (abs!! (-!! dist1-pvar dist2-pvar))
                     (!!f diff-thresh))
                   (>=!! theta1 (!!f tangent-thresh))
                   (>=!! theta2 (!!f tangent-thresh))
                   (<=!! (abs!! (-!! theta1 theta2)) (!!f symm-thresh)))
              (*when (=!! dist symmdist)
               (*set symmquad1 (!!f q1) symmquad2 (!!f q2)))))))))))))
      (loop for symm-link-pvar in symm-link-pvars
         for dist-pvar in dist-pvars
         for quad from 1 do
       (*set (fpvl symm-link-pvar 1) (!! 0))
       (*when (or!! (=!! symmquad1 (!!f quad)) (=!! symmquad2 (!!f quad)))
        (*set (fpvl symm-link-pvar 1) (!! 1))
        (*set (fpv symax-pvar) (fpv dist-pvar))))))))

;; This operation implements the local symmetry detection schemes.
;; It computes orientation symmetry if the
;; orientation-pvar is passed. Otherwise it computes position symmetry.

;; default is position symmetry
(defun GROUP-SYMMETRIC
    (active links symax-pvar group-pvars
     &optional orientation-pvar
     &key
     (diff-thresh default-symax-diff-threshold)
     (angl-thresh default-symax-angl-threshold)
     (dist-thresh default-symax-dist-threshold)
     (tangent-thresh 0)
```

```
        (symm-thresh 360))
 (let ((link-pvars (link-path links))
       (dist-pvars (link-dist links))
       (angl-pvars (link-angl links)))
  (*locally
    (label-local-symmetries
      active (or orientation-pvar (!! 0))
      link-pvars dist-pvars angl-pvars symax-pvar group-pvars
      diff-thresh tangent-thresh angl-thresh symm-thresh dist-thresh))))
```

---

;;;-*- Syntax: Common-lisp;mode: lisp; package: REVERSE-GRAPHICS; base: 10-*-

;;; This file contains link-based coloring operations.

;;;------------------------------------------------------------------
;;; Generalized "between" relation.

;; This operation simply turns on locations that are between two
;; boundaries. Assumes raw linking has already been done on the union
;; of the base layer contents of token-slot-1 and token-slot-2.

```
(defun label-betweens
     (active link-pvars dist-pvars angl-pvars
      boundary1-pvar boundary2-pvar between-pvar min-angle)
  (*let fields neighbor-boundary1-pvars 4 1
   (*let-fields neighbor-boundary2-pvars 4 1
    (loop for quad from 1 to 4
          for link-pvar in link-pvars
          for i from 0 do
     (read-link active link-pvar boundary1-pvar (nth i neighbor-boundary1-pvars) quad)
     (read-link active link-pvar boundary2-pvar (nth i neighbor-boundary2-pvars) quad))
    (*set between-pvar (!! 0))
    (loop for dist1-pvar in dist-pvars
          for angl1-pvar in angl-pvars
          for q1 from 1 do
     (loop for dist2-pvar in dist-pvars
           for angl2-pvar in angl-pvars
           for q2 from 1 do
      (unless (= q1 q2)
       (*when (and!! (zerop!! boundary1-pvar) (zerop!! boundary2-pvar))
        (*when (and!! (plusp!! dist1-pvar) (plusp!! dist2-pvar))
         (*when (or!! (and!!
                       (plusp!! (nth (1- q1) neighbor-boundary1-pvars))
                       (plusp!! (nth (1- q2) neighbor-boundary2-pvars)))
                      (and!!
                       (plusp!! (nth (1- q1) neighbor-boundary2-pvars))
                       (plusp!! (nth (1- q2) neighbor-boundary1-pvars))))
          (*when (>=!! (orientation-difference!! angl1-pvar angl2-pvar)
                       (!!f min-angle))
           (*set between-pvar (!! 1)))))))))))))

(defvar default-between-min-angle 150.)
```

;; To fill holes, pass figure as active.
;; To label visible, pass 0 as min-angle.

```
(defun SPREAD-BY-LINKS-BACKWARD
       (active links figure
        &optional (min-angle default-between-min-angle))
  (let ((paths (link-path links))
        (dists (link-dist links))
        (angls (link-angl links)))
    (*let (new union)
      (declare (type (field-pvar 1) new union))
      (s1<-s2 union active)
      (s1<-s1+s2 union figure)
      (link-create union links)
      (label-betweens union paths dists angls figure active new min-angle)
      (s1<-s1+s2 figure new))))
```

;; The following are high level coloring operations based on the
;; between relation.

;; to color connected, pass 0 as min-angle.

;; basically, this is safe for (1) closed curves (test = evenp); (ii)
;; convex open curves (test = zerop); or (iii) any open curve that has
;; be singled out a priori (test = evenp).

;; PAINT-FROM-SEED implements the connected region and partially-bounded
;; region coloring operations. (It
;; implements connected regin coloring when the argument min-angle is
;; 0).

```
(defun PAINT-FROM-SEED
       (selected links figure
        &key distance (min-angle default-between-min-angle) (steps 10)
        &aux (step 0))
  (declare (special selected links figure distance min-angle steps step))
  (let-s (active new)
    (s1<-s2 active selected)
    (if distance (p<-0 distance))   ;display purpose only
    (filter-adjacent active figure new)
    (loop while (and (plusp (readout-sum new active))
                     (< step steps)) do
      (setq step (1+ step))
      (spread-by-links-backward active links figure min-angle)
      (if distance (p1<-p1+p2 distance figure))
      (s1<-s1+s2 active figure)
      (filter-adjacent active figure new))))
```

;;

```
(defun PAINT-FROM-FOCUS
       (selected links focus figure
        &key (steps 10) distance (min-angle default-between-min-angle))
  (s1<-s2 figure focus)
  (paint-from-seed selected links figure
    :distance distance :min-angle min-angle :steps steps))
```

;; SPREAD-BY-LINKS-FORWARD implements the basic group-labeling operation.

```
(defun SPREAD-BY-LINKS-FORWARD
    (active link-pvars figure &optional actp-slots)
  (*locally
    (declare (type (field-pvar 1) figure active))
    (*let ((temp (!! 0)))
      (declare (type (field-pvar 1) temp))
      (*set temp figure)
      (converge-or active link-pvars temp temp actp-slots)
      (*set figure (and01!! temp active)))))

;;; -----------------------------------------------------------------
;;; Component labeling.

;; This function implements the basic coloring process.

(defun SPREAD-BY-CHUNKS
    (active mvl figure &optional disp? step?
     &aux (nullv (1+ top-chunking-level)))
  (*locally
    (declare (type (field-pvar 1) active figure)
             (type (field-pvar (pvar-length mvl)) mvl))
    (let ((top-level (*max (value-when!! mvl (not=01!! mvl (!!f nullv))))))
      (*let ((ftemp (!! 0)) (ptemp (!! 0)))
        (declare (type (field-pvar 1) ftemp ptemp))
        (*set ftemp figure)
        (loop for l from 1 to top-level do
          (*when (valid-level?? l mvl)
            (*set ftemp
              (or01!! (child-ref!! ftemp 1 l)
                      (child-ref!! ftemp 2 l)))))
        (loop for l from top-level downto 1 do
          (*when (valid-level=?? l mvl) (*set ptemp ftemp))
          (*let ((ctemp (child-ref!! ptemp 2 l)))
            (declare (type (field-pvar 1) ctemp))
            (setf (child-ref!! ptemp 2 l) (or01!! ptemp ctemp))))
        (*set figure (or01!! figure (and01!! ptemp active)))))))

;; a1, a2, and RESULT are binary pvar. pixels in a1 adjacent to pixels
;; of a2 are set to 1 in RESULT. Other pixels are set to 0 in result.
(defun FILTER-ADJACENT (a1 a2 result)
  (let-s (c2)
    (s1<-s2 c2 a2)
    (s<-s- c2)
    (filter-edges c2 c2)
    (s1<-s1*s2 c2 a1)
    (s1<-s2 result c2)))

;; colors from one or more seed locations in figure.

;; COLOR-FROM-SEED implements connected component labeling and
;; (optionally) group labeling at the top level.

(defun COLOR-FROM-SEED
    (selected figure
```

```
        &key links groups
        (start-level 0) (stop-level top-chunking-level)
        disp? step?)
  (declare (special selected links groups figure start-level disp? step?))
  (let-s (active new old)
   (let-p (maxl-valid)
    (s1<-s2 active selected)
    (if (zerop (readout-max active figure))
     (s<-s- active))
    (label-valid-scale active maxl-valid start-level)
    (s1<-s2 new figure)
    (s1<-s2 old figure)
    (loop while (plusp (readout-sum new active)) do
     (spread-by-chunks
       active maxl-valid figure
       :stop-level stop-level
       :disp? disp? :step? step?)
     (when groups
       (spread-by-links-forward selected (link-path links) figure groups))
     (s1<-s2 new figure)
     (s1<-s1-s2 new old)
     (s1<-s2 old figure)))))
```

---

;;;

;; This function implements hierarchical processes for distributing the maximum
;; of a given variable to the upper left corner of each maximal valid
;; region and then distributing each value to all pixels in its region.

```
(defun FLOAT-PROJECT-VALUE
     (value result active mvl &key (combiner 'max!!) (null-value 0))
 (*locally
   (declare (type (field-pvar (pvar-length value)) value result)
        (type (field-pvar (pvar-length mvl)) mvl)
        (type (field-pvar 1) active))
   (*let ((ftemp (!! 0)) (ptemp (!! 0)) (mvl1 (!! 0)))
    (declare (type (field-pvar (pvar-length value)) ftemp ptemp)
        (type (field-pvar (pvar-length mvl)) mvl1))
    (*set ftemp (if!! (plusp!! active) value (!! 0)))
    (*set mvl1 (if!! (<=!! mvl (!!f top-chunking-level)) mvl (!! 0)))  ;max is null value
    (loop for l from 1 to (*max mvl1) do  ;top-chunking-level
     (*when (bpv (valid-level?? l mvl))
      (*let ((temp (!! 0)))
       (declare (type (field-pvar (pvar-length value)) temp))
       (*set temp (*funcall combiner (child-ref!! ftemp 1 l) (child-ref!! ftemp 2 l)))
       (*set ftemp temp))))
    (loop for l from (*max mvl1) downto 1 do  ;top-chunking-level
     (*when (valid-level=?? l mvl)       ; (and!! *** (=!! ptemp nullval))
      (*set ptemp ftemp))
     (*let ((ctemp (child-ref!! ptemp 2 l)))
      (declare (type (field-pvar (pvar-length value)) ctemp))
      (setf (child-ref!! ptemp 2 l) (max!! ptemp ctemp))))  ;not combiner?
    (*set result (if!! (plusp!! active) ptemp (!!f null-value))))))
```

;;; ---
;;;

```
;; This function is a generalization of the preceding function
;; (FLOAT-PROJECT-VALUE) which enables a number of other variables to
;; track the propagated value. It propagates the minimum rather than
;; the maximum.

(*defun FLOAT-PROJECT-VALUE-LIST
    (value result value-list result-list mvl active ractive)
    (declare (type (field-pvar (pvar-length value)) value result)
        (type (field-pvar (pvar-length mvl)) mvl)
        (type (field-pvar 1) active ractive))
  (let ((ftemps
          (loop for pvar in value-list
                collect (allocate!!
                          (if!! (plusp!! active) pvar (!! 0))
                          nil `(field-pvar (pvar-length ,pvar)))))
        (ptemps
          (loop for pvar in value-list
                collect (allocate!!
                          (!! 0) nil `(field-pvar (pvar-length ,pvar))))))
    (*let ((ftemp (!! 0)) (ptemp (!! 0)))
      (declare (type (field-pvar (pvar-length value)) ftemp ptemp))
      (*set ftemp (if!! (plusp!! active) value (!! 0)))
      (loop for l from 1 to top-chunking-level do
        (*let ((c1ftemp (child-ref!! ftemp 1 l))
               (c2ftemp (child-ref!! ftemp 2 l)))
          (declare (type (field-pvar (pvar-length value)) c1ftemp c2ftemp))
          (*when (valid-level?? l mvl)
            (*cond
              ((or!! (and!! (plusp!! c1ftemp) (plusp!! c2ftemp)
                       (<=!! c1ftemp c2ftemp))
                    (and!! (plusp!! c1ftemp) (zerop!! c2ftemp)))
               ;  (*set ftemp c1ftemp)
               ;  (loop for ftemp1 in ftemps do
               ;    (*locally
               ;      (declare (type (field-pvar (pvar-length ftemp1)) ftemp1))
               ;      (*set ftemp1 (child-ref!! ftemp1 1 l))))
               )
              ((or!! (and!! (plusp!! c1ftemp) (plusp!! c2ftemp)
                       (<=!! c2ftemp c1ftemp))
                    (and!! (plusp!! c2ftemp) (zerop!! c1ftemp)))
               (*set ftemp c2ftemp)
               (loop for ftemp1 in ftemps do
                 (*locally
                   (declare (type (field-pvar (pvar-length ftemp1)) ftemp1))
                   (*set ftemp1 (child-ref!! ftemp1 2 l)))))
              )))))
      (loop for l from top-chunking-level downto 1 do
        (*when (and!! (valid-level=?? l mvl) (zerop!! ptemp))
          (*set ptemp ftemp)
          (loop for ftemp1 in ftemps
                for ptemp1 in ptemps do
            (*locally
              (declare (type (field-pvar (pvar-length ptemp1)) ptemp1 ftemp1))
              (*set ptemp1 ftemp1))))
        (*let ((ctemp (child-ref!! ptemp 2 l)))
          (declare (type (field-pvar (pvar-length value)) ctemp))
          (*when (or!! (and!! (plusp!! ptemp) (plusp!! ctemp)
                         (<!! ptemp ctemp))
```

```
      (and!! (plusp!! ptemp) (zerop!! ctemp)))
    (setf (child-ref!! ptemp 2 I) ptemp)
    (loop for ptemp1 in ptemps do
      (*locally
        (declare (type (field-pvar (pvar-length ptemp1)) ptemp1))
        (setf (child-ref!! ptemp1 2 I) ptemp1))))))
  (*set result (if!! (plusp!! ractive) ptemp result))
  (loop for result1 in result-list
        for ptemp1 in ptemps do
    (*locally
      (declare (type (field-pvar (pvar-length result1)) result1 ptemp1))
      (*set result1 (if!! (plusp!! ractive) ptemp1 result1)))))
  (loop for temp in (append ftemps ptemps) do
    (*deallocate temp))))
```

---

What is claimed:

1. A method of operating a system that includes memory and a processor connected for accessing the memory, the method comprising steps of:

for an image that includes a plurality of pixels, storing in the memory a respective data item for each pixel, each pixel's respective data item including respective value data for the pixel and pixel set data indicating whether the pixel is in an indicated set of pixels;

operating the processor to produce, for a first one of the pixels, near neighbor attribute data; the near neighbor attribute data indicating a first attribute for a first near neighbor link of the first pixel and indicating a second attribute for a second near neighbor link of a second one of the pixels; and operating the processor to use the near neighbor attribute data of the first pixel to determine whether the first near neighbor link of the first pixel is a link to the second pixel and the second near neighbor link of the second pixel is a link to the first pixel and, if so, setting the first pixel's pixel set data to indicate that the first pixel is in the indicated set of pixels.

2. The method of claim 1 in which the near neighbor attribute data indicate a first quadrant and a first offset for the first near neighbor link and a second quadrant and a second offset for the second near neighbor link; the step of operating the processor to use the near neighbor attribute data comprising substeps of:

determining whether the first and second quadrants are opposite; and if the first and second quadrants are opposite, determining whether the first and second offsets are equal in magnitude.

3. The method of claim 1 in which the near neighbor attribute data indicate a link orientation and a distance for the first near neighbor link, the method further comprising a step of operating the processor to use the near neighbor attribute data of the first pixel to determine whether the first pixel and the second pixel are in a group, comprising substeps of:

obtaining a minimum of a maximum distance and the distance for the first near neighbor link;

using the minimum to obtain a proportion of a maximum orientation difference;

obtaining a difference between the link orientation for the first near neighbor link and an independent orientation for the first pixel; and comparing the proportion of the maximum orientation difference with the difference between the link orientation for the first near neighbor link and the independent orientation for the first pixel.

4. The method of claim 1 in which the first attribute is a first length and the second attribute is a second length; the step of operating the processor to use the near neighbor attribute data including a substep of comparing the first and second lengths.

5. The method of claim 1 in which the first attribute is a first link orientation and the second attribute is a second link orientation; the step of operating the processor to use the near neighbor attribute data including a substep of comparing the first and second link orientations.

6. The method of claim 1 in which the near neighbor attribute data further indicate a third attribute for the first near neighbor link and indicate a fourth attribute for the second near neighbor link; the first attribute being a first length; the second attribute being a second length; the third attribute being a first link orientation; the fourth attribute being a second link orientation; the step of operating the processor to use the near neighbor attribute data including substeps of:

comparing the first and second link orientations; and
comparing the first and second lengths.

7. A method of operating a system that includes memory and a processor connected for accessing the memory, the method comprising steps of:

for an image that includes a plurality of pixels, storing in the memory a respective data item for each pixel, each pixel's respective data item including respective value data for the pixel and pixel set data indicating whether the pixel is in an indicated set of pixels;

operating the processor to produce, for a first one of the pixels, near neighbor attribute data; the near neighbor attribute data indicating a first relative orientation from the first pixel to a first near neighbor pixel and indicating a second relative orientation from the first pixel to a second near neighbor pixel; and operating the processor to use the near neighbor attribute data of the first pixel to determine whether the difference between the first and second relative orientations is approximately 180° and, if so, setting the first pixel's pixel set data to indicate that the first pixel is in the indicated set of pixels.

8. The method of claim 7 in which, if the difference between the first and second relative orientations is approximately 180°, the step of operating the processor to use the near neighbor attribute data further includes a substep of determining whether the respective pixel set data of each of the first and second near neighbor pixels indicate that the first and second near neighbor pixels are in the indicated set.

9. The method of claim 7 in which the near neighbor attribute data indicate whether the first near neighbor pixel is a boundary pixel; the step of operating the processor to use the near neighbor attribute data including, if the difference between the first and second relative orientations is approximately 180°, a substep of determining whether the near neighbor attribute data indicate that the first near neighbor pixel is a boundary pixel and, if so, determining whether the pixel set data of the second near neighbor pixel indicate that the second near neighbor pixel is in the indicated set.

10. A method of operating a system that includes memory and a processor connected for accessing the memory, the method comprising steps of:

for an image that includes a plurality of pixels, storing in the memory a respective data item for each pixel, each pixel's respective data item including pixel set data indicating whether the pixel is in an indicated set of pixels; a first one of the pixel's pixel set data indicating that the pixel is in the indicated set of pixels; and for each of a series of steps, operating the processor to set the pixel set data of a number of additional ones of the pixels until a final step in which the number of additional pixels is not sufficient to justify another step;

each of the steps of operating the processor to set the pixel set data of additional pixels comprising substeps of:

producing, for each pixel, near neighbor attribute data indicating an attribute of a near neighbor pixel of the pixel, the attribute being whether the near neighbor pixel's pixel set data indicates that the pixel is in the indicated set of pixels; and for each pixel whose near neighbor attribute data indicates that the near neighbor pixel is in the indicated set of pixels, applying a labeling criterion to determine whether to set the pixel's pixel set data to indicate that the pixel is in the set of pixels and, if so, setting the pixel's pixel set data accordingly.

11. The method of claim 10 in which the number of additional pixels is not sufficient to justify another step when the number of additional pixels is zero.

12. The method of claim 10 in which the labeling criterion is whether the pixel's near neighbor attribute data indicates that the near neighbor pixel is in the indicated set of pixels.

13. The method of claim 10 in which, after the final step, the indicated set of pixels defines a region of the image.

14. A method of operating a system that includes memory and a processor connected for accessing the memory, the method comprising steps of:

for an image that includes a plurality of pixels, storing in the memory a respective data item for each pixel, each pixel's respective data item including respective value data for the pixel and pixel set data indicating whether the pixel is in an indicated set of pixels;

operating the processor to produce, for a first one of the pixels, near neighbor attribute data indicating an attribute for a plurality of near neighbor links; and operating the processor to apply a link relationship criterion to the near neighbor attribute data of the first pixel to determine whether the plurality of near neighbor links are related in a manner that meets the link relationship criterion and, if so, setting the first pixel's pixel set data to indicate that the first pixel is in the indicated set of pixels;

the near neighbor attribute data indicating a distance between the first pixel and a second pixel; the step of operating the processor to apply the link relationship criterion comprising a substep of varying the criterion with the distance indicated by the near neighbor attribute data.

15. A method of operating a system that includes memory and a processor connected for accessing the memory, the method comprising steps of:

for an image that includes a plurality of pixels, storing in the memory a respective data item for each pixel, each pixel's respective data item including respective value data for the pixel and pixel set data indicating whether the pixel is in an indicated set of pixels;

operating the processor to produce, for each of a plurality of the pixels, near neighbor attribute data that indicate a first attribute for a first near neighbor link of the pixel and that indicate a second attribute for a second near neighbor link of the pixel; and operating the processor to apply a link relationship criterion to the near neighbor attribute data of each of the plurality of the pixels to determine whether the first and second near neighbor links of each pixel are related to each other in a manner that meets the link relationship criterion and, if so, setting the pixel's pixel set data to indicate that the pixel is in the indicated set of pixels.

16. The method of claim 15 in which the first attribute is a first length and the second attribute is a second length, the link relationship criterion comparing the first length and the second length.

17. The method of claim 15 in which the first attribute is a first orientation and the second attribute is a second orientation, the link relationship criterion comparing the first orientation and the second orientation.

18. The method of claim 15 in which the near neighbor attribute data indicate a first length for the first near neighbor link and a second length for the second near neighbor link, the link relationship criterion determining whether the first length is much longer than the second length.

19. The method of claim 18 in which the step of operating the processor to apply the link relationship criterion comprises substeps of:

obtaining a square of a difference between the first and second lengths;

obtaining a sum of the first and second lengths; and obtaining a ratio of the square of the difference to the sum.

20. The method of claim 15 in which the near neighbor attribute data indicate a first orientation for the first near neighbor link and a second orientation for the second near neighbor link, the link relationship criterion determining whether the first and second orientations are sufficiently aligned.

21. The method of claim 20 in which the near neighbor attribute data further indicate a first distance for the first near neighbor link and a second distance for the second near neighbor link, the step of operating the processor to apply the link relationship criterion comprising substeps of:

obtaining a greater one of the first and second distances;

obtaining a minimum of a maximum distance and the greater one of the first and second distances; and using the minimum to obtain a proportion of a maximum orientation difference.

* * * * *